(12) United States Patent
Isenhour et al.

(10) Patent No.: US 9,377,565 B2
(45) Date of Patent: Jun. 28, 2016

(54) PROCESSING OF GRADIENT INDEX (GRIN) RODS INTO GRIN LENSES ATTACHABLE TO OPTICAL DEVICES, COMPONENTS, AND METHODS

(75) Inventors: Micah C. Isenhour, Linconlton, NC (US); Dennis M. Knecht, Hickory, NC (US); James P. Luther, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 940 days.

(21) Appl. No.: 13/571,948

(22) Filed: Aug. 10, 2012

(65) Prior Publication Data
US 2014/0042647 A1 Feb. 13, 2014

(51) Int. Cl.
*B29D 11/00* (2006.01)
*G02B 3/00* (2006.01)
*G02B 6/32* (2006.01)
*G02B 6/26* (2006.01)
*G02B 6/36* (2006.01)

(52) U.S. Cl.
CPC ............... *G02B 3/0087* (2013.01); *G02B 6/32* (2013.01); *G02B 6/262* (2013.01); *G02B 6/3652* (2013.01)

(58) Field of Classification Search
CPC .... G02B 3/0087; G02B 6/262; G02B 6/3652; G02B 6/32
See application file for complete search history.

(56) References Cited

U.S. PATENT DOCUMENTS

| 4,044,936 | A | * | 8/1977 | Obersby et al. | .................... | 225/2 |
| 5,050,953 | A | | 9/1991 | Anderson et al. | ............... | 385/89 |
| 5,163,107 | A | | 11/1992 | Garriss | .......................... | 385/74 |
| 5,333,225 | A | | 7/1994 | Jacobowitz et al. | ............ | 385/93 |
| 5,636,429 | A | * | 6/1997 | Croombs | ............ | B26D 7/0666 29/564.6 |
| 6,035,084 | A | | 3/2000 | Haake et al. | ..................... | 385/49 |
| 6,493,489 | B2 | | 12/2002 | Mertz et al. | ..................... | 385/52 |
| 6,619,858 | B1 | | 9/2003 | Lytel et al. | ...................... | 385/89 |
| 6,635,861 | B1 | | 10/2003 | Stone | .......................... | 250/216 |
| 6,901,221 | B1 | | 5/2005 | Jiang et al. | ..................... | 398/138 |
| 7,031,567 | B2 | | 4/2006 | Grinderslev et al. | .......... | 385/34 |
| 7,164,818 | B2 | | 1/2007 | Bryan et al. | ..................... | 385/33 |
| 7,234,874 | B2 | | 6/2007 | Morse et al. | ..................... | 385/53 |
| 7,591,780 | B2 | | 9/2009 | Jacobsen et al. | .............. | 600/109 |
| 2005/0045896 | A1 | * | 3/2005 | Goh et al. | ......................... | 257/98 |
| 2005/0151286 | A1 | * | 7/2005 | Liu | .............................. | 264/1.38 |
| 2007/0116408 | A1 | | 5/2007 | Eberle et al. | .................... | 385/31 |
| 2008/0185672 | A1 | | 8/2008 | Jacobsen et al. | .............. | 257/432 |
| 2010/0284651 | A1 | | 11/2010 | Krähenbühl et al. | ........... | 385/35 |

(Continued)

FOREIGN PATENT DOCUMENTS

| CA | 2057100 | 10/1992 | ............... G02B 6/28 |
| CN | 1776472 A | 5/2006 | ............... G02B 6/32 |

(Continued)

*Primary Examiner* — Mathieu Vargot

(57) ABSTRACT

Embodiments for processing of gradient index (GRIN) rods into GRIN lenses attachable to optical devices, components, and methods are disclosed. A cylindrical GRIN rod comprises an optical axis and a longitudinal axis at a center axis, where the index of refraction may be greatest at the optical axis. The GRIN rod includes GRIN lenses along the longitudinal axis. The GRIN lenses include a first optical surface and a second optical surface opposite the first optical surface. Separation processes and devices may separate the GRIN lenses from the GRIN rods and these processes may be automated. Other processes may polish the first and the second optical surfaces. A gripper may insert the GRIN lens into an optical device.

26 Claims, 25 Drawing Sheets

(56) References Cited

U.S. PATENT DOCUMENTS

| | | | |
|---|---|---|---|
| 2012/0155803 A1 | 6/2012 | Benjamin et al. | 385/33 |
| 2012/0155807 A1 | 6/2012 | Knapp | 385/61 |
| 2012/0163754 A1 | 6/2012 | Benjamin et al. | 385/33 |
| 2012/0177327 A1 | 7/2012 | DeMeritt et al. | 385/74 |

FOREIGN PATENT DOCUMENTS

| | | | | |
|---|---|---|---|---|
| EP | 0511435 B1 | 10/2001 | | G02B 6/28 |
| GB | 2245987 A | 1/1992 | | G02B 6/38 |
| GB | 2388670 A | 11/2003 | | G02B 6/32 |
| JP | 2002-182062 | 6/2002 | | G02B 6/293 |
| WO | WO00/46620 | 8/2000 | | G02B 6/32 |
| WO | WO02/095471 A1 | 11/2002 | | G02B 6/43 |
| WO | WO03/010564 A2 | 2/2003 | | |
| WO | WO03/081831 A2 | 10/2003 | | |
| WO | WO03/098290 A1 | 11/2003 | | G02B 6/04 |
| WO | WO03/098294 A1 | 11/2003 | | G02B 6/16 |
| WO | WO03/098301 A2 | 11/2003 | | G02B 6/36 |
| WO | WO2007/062050 A2 | 5/2007 | | G02B 6/38 |
| WO | WO2009/030360 A1 | 3/2009 | | G02B 6/38 |
| WO | WO2012/078697 A1 | 6/2012 | | G02B 6/38 |
| WO | WO2012/078701 A1 | 6/2012 | | G02B 6/38 |
| WO | WO2012/096915 A1 | 7/2012 | | G02B 6/32 |

\* cited by examiner

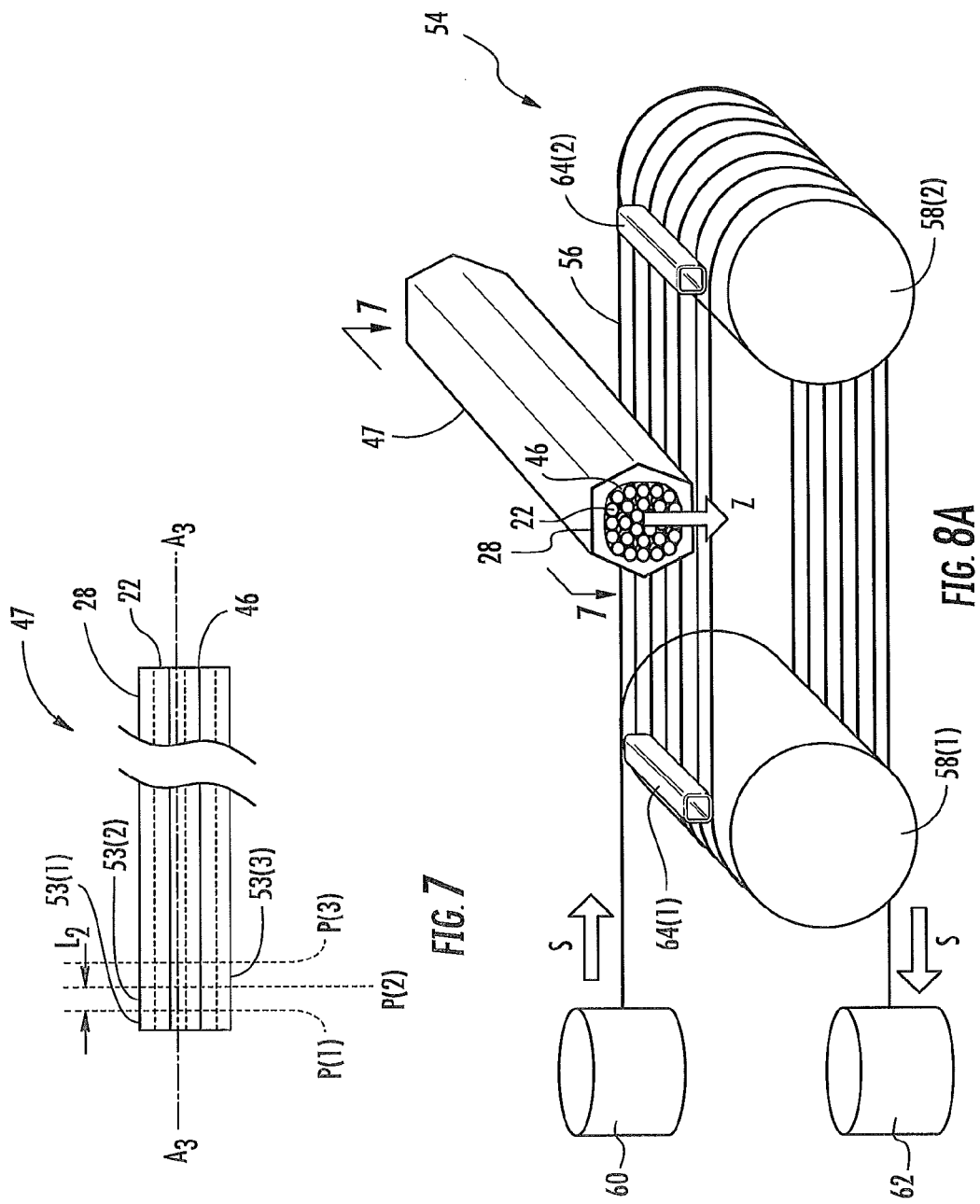

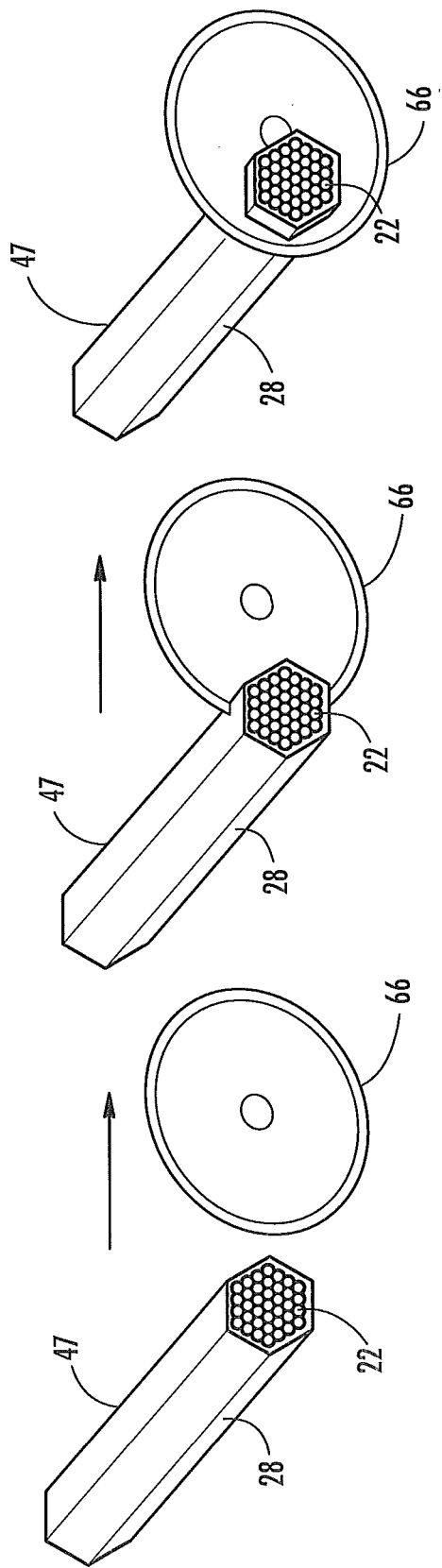

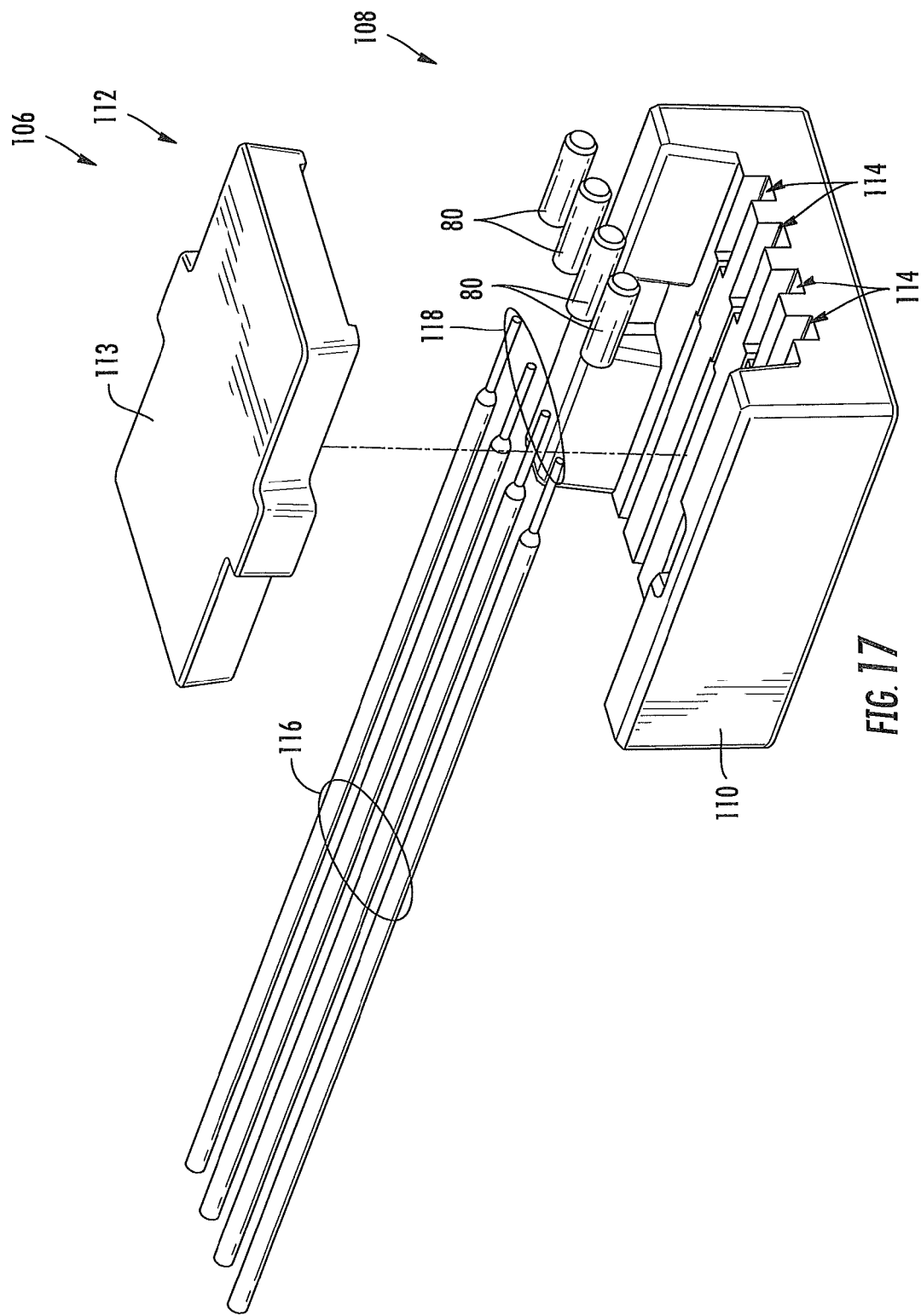

PROCESSING OF GRADIENT INDEX (GRIN) RODS INTO GRIN LENSES ATTACHABLE TO OPTICAL DEVICES, COMPONENTS, AND METHODS

RELATED APPLICATION

The present application is related to U.S. Non-Provisional patent application Ser. No. 13/571,278 filed on even date herewith and entitled "Binding Material Processing of Gradient Index (GRIN) Rods Into GRIN Lenses Attachable To Optical Devices, Components, and Methods," which is incorporated herein by reference in its entirety.

BACKGROUND

1. Field of the Disclosure

The technology of the disclosure relates to gradient index (GRIN) lens manufacturing configured to support GRIN lens assembly, wherein the GRIN lens assembly may mount the GRIN lens in optical plugs, receptacles and the like for facilitating optical connections.

2. Technical Background

Benefits of optical fiber include extremely wide bandwidth and low noise operation. Because of these advantages, optical fiber is increasingly being used for a variety of applications, including but not limited to broadband voice, video, and data transmission as end-users require more bandwidth. Fiber optic networks employing optical fiber are being developed and used to deliver voice, video, and data transmissions to subscribers over both private and public networks. As optical cable assemblies begin to be utilized in consumer electronic applications for allowing higher data transfer speeds between electronic devices the limitations of conventional telecommunication designs are realized. Although telecommunication fiber optic networks often include separated connection points linking optical fibers to provide "live fiber" from one connection point to another connection point using cable assemblies, the needs and environment for consumer cable assembly applications are much different. In this regard, telecommunication fiber optic equipment is located in data distribution centers, central offices, or other clean environments for supporting optical fiber interconnections and typically do not experience the large number of mating cycles like those required for consumer electronic applications. Moreover, telecommunication cable assemblies are high-precision products that are typically protected from dirt, debris, and the like; whereas, consumer electronic devices will need to operate in ordinary environments where exposure to dirt and debris will be a common occurrence.

Fiber optic connectors are provided to facilitate optical connections with optical fibers for the transfer of light and associated data. For example, optical fibers can be optically connected to another optical device, such as a light-emitting diode (LED), laser diode, or opto-electronic device for light transfer. As another example, optical fibers can be optically connected to other optical fibers through mated fiber optic connectors. In any of these cases, it is important that an end face of an optically connected optical fiber be precisely aligned with the optical device or other optical fiber to avoid or reduce coupling loss. For example, the optical fiber is disposed through a ferrule that precisely locates the optical fiber with relation to the fiber optic connector housing.

By way of example, conventional fiber optic connectors for telecommunications use a flat end-faced multi-fiber ferrules for facilitating multiple direct optical fiber-to-optical fiber connections between the fiber optic connector supporting the ferrule and other fiber optic connectors or other devices having an optical connection. In this regard, it is important that fiber optic connectors are designed to allow the end faces of the optical fibers disposed in the ferrule to be placed into contact or closely spaced with an optical connection or other optical fiber for light transfer. These conventional multi-fiber, fiber optic connectors used for the telecommunication applications require a time-consuming manufacturing process for preparing a precision surface for direct optical fiber-to-optical fiber mating. By way of example, after the optical fibers are secured so the optical fiber extends beyond the mating end face, the excess fiber is removed by laser cleaving and the remaining protruding fiber is mechanically polished using abrasives for obtaining a precision end face with a highly planar array for maintaining tight alignment of optical fibers between connectors. When these connectors are mated, the end faces of the fibers touch providing for low-loss across the optical interface, but precise polishing is required to obtain this type of mating geometry. This high precision polishing is costly and difficult since it is time-consuming requires equipment and consumables for polishing and multiple manufacturing steps. Moreover, this type of construction is not well suited for the large number of mating cycles that a consumer device application is expected to experience. Thus, conventional constructions and methods for making cable assemblies are not suitable for cable assemblies directed to consumer devices for these and other reasons.

Fiber gradient index (GRIN) rod lenses offer an alternative to costly, high accuracy mechanical polishing. FIG. 1A is an example of a GRIN lens 10. The GRIN lens may be concentric to a longitudinal axis $A_1$ and may have a diameter $D_1$ and length $L_1$. The GRIN lens 10 may comprise a fiber GRIN rod lens drawn from a multimode fiber core cane.

GRIN lenses focus light through a precisely controlled radial decrease of the lens material's index of refraction from an optical axis at a longitudinal axis $A_1$ to the edge of the lens at a radius $r_1$ from the longitudinal axis $A_1$. FIG. 1B depicts an exemplary decrease in an index of refraction N for the GRIN lens of FIG. 1A. As shown in FIG. 1B, the index of refraction is $n_2$ at the center of the GRIN lens 10 (at the longitudinal axis $A_1$) is typically the highest value and decreases to an index of refraction of $n_1$ at the edge of the lens which is at radius $r_1$. Exemplary indices of refraction may be 1.54 for $n_2$ and 1.43 for $n_1$ at a radius $r_1$ of 0.25 millimeters, and other values are commercially available.

The internal structure of this index gradient can dramatically reduce the need for precision mechanically-polished fiber arrays and results in a simple, compact lens. This allows a GRIN lens 10 with flat surfaces to collimate (focus into infinity) light emitted from an optical fiber or to focus an incident beam into an optical fiber. For example, FIG. 1A depicts a quarter-pitch GRIN lens 10 which collimates light from a single point source P located at a first optical surface 11 of the GRIN lens 10. The collimation is shown by light rays 12(1), 12(2), 12(3), 12(4), 12(5) which exit a second optical surface 14 of the GRIN lens 10 parallel. The GRIN lens 10 may be, for example, a GRIN lens manufactured by Corning, Incorporated of Corning, N.Y.

The GRIN lens 10 can be provided in the form of a glass rod that is mounted, for example, in an optical connection such as a fiber optic connector. The flat surfaces of a GRIN lens allow easy bonding or fusing of one end to an optical fiber disposed inside the fiber optic connector with the other end of the GRIN lens disposed on a ferrule end face of the fiber optic connector. The flat surface on the end face of a GRIN lens can reduce aberrations, because the end faces can be polished to be planar or substantially planar to the end face of the ferrule. The flat surface of the GRIN lens allows for easy cleaning of end faces of the GRIN lens.

Conventional labor-intensive processes to create GRIN lenses from GRIN rods are expensive because of the complexities in processing parts that may have sub-millimeter features and precise optical surface requirements for optical performance. New approaches are needed to reduce the manufacturing cost of GRIN lenses while maintaining product quality.

SUMMARY OF THE DETAILED DESCRIPTION

Embodiments disclosed herein include methods for processing of gradient index (GRIN) rods into GRIN lenses. The GRIN lenses are attachable to optical devices, components, and the like as desired. A cylindrical GRIN rod comprises an optical axis and a longitudinal axis at a center axis with an index of refraction may be greatest at the optical axis. The GRIN rod may be fed off a real and have portions separated for producing GRIN lenses along the longitudinal axis of the GRIN rod. The GRIN lenses include a first optical surface and a second optical surface opposite the first optical surface. Separation processes and devices may separate the GRIN lenses from the GRIN rods and these processes may be automated as desired. Other optional steps in the processes may include polishing the first and the second optical surfaces. Thereafter, a gripper may insert the GRIN lens into an optical device.

One explanatory embodiment disclosed is directed to a method of manufacturing a GRIN lens. The method may include the steps of paying out a GRIN rod from a reel. Next, the method may also include separating a GRIN lens from the GRIN rod with a gripper. The GRIN lens may include a first optical surface angled largely perpendicular to a longitudinal axis and a second optical surface angled largely perpendicular to the longitudinal axis. The second optical surface may be disposed a longitudinal distance along the longitudinal axis from the first optical surface. Other optional steps disclosed herein may also be included with this method.

In another embodiment, a workpiece for manufacturing GRIN lenses from a GRIN rod is disclosed. The workpiece may include a plurality of GRIN rods configured to be separated into at least one GRIN lens. The workpiece may also comprise an optional carrier. The carrier may include a carrier body and an orifice. The orifice may be disposed within the carrier body and may be formed by an inner surface of the carrier body. The workpiece may also include a binding material configured to connect to the plurality of GRIN rods and the carrier body. At least a portion of the plurality of GRIN rods may be disposed within the orifice. The workpiece may also include other optional structure as disclosed herein.

In yet another embodiment, a method of manufacturing and assembling a gradient index lens is disclosed. The method may include providing a plurality of GRIN rods. Next, the method may include forming a workpiece by connecting the plurality of GRIN rods with binding material. The method may also include separating a portion from the workpiece. The portion of the workpiece may include a plurality of GRIN lenses. Each of the plurality of GRIN lenses may include a first optical surface angled largely perpendicular to a longitudinal axis and a second optical surface angled largely perpendicular to the longitudinal axis and disposed a longitudinal distance along the longitudinal axis from the first optical surface.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 7 is a top view of separation planes of the carrier of FIG. 5;

FIG. 8A is a perspective view of the carrier of FIG. 5 being cut by a diamond wire saw;

FIG. 8B is a perspective view of the carrier of FIG. 5 being cut by a diamond radial saw;

FIG. 17 is a perspective exploded view of an exemplary optical device to which the GRIN lens of FIGS. 16A through 16C may be assembled;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include methods for processing of gradient index (GRIN) rods into GRIN lenses. The GRIN lenses are attachable to optical devices, components, and the like. A cylindrical GRIN rod comprises an optical axis and a longitudinal axis at a center axis and an index of refraction may be greatest at the optical axis of the rod. The GRIN rod may be separated for forming GRIN lenses along the longitudinal axis according to the concepts disclosed. The GRIN lenses include a first optical surface and a second optical surface opposite the first optical surface. Separation processes and devices may separate the GRIN lenses from the GRIN rods and these processes may be automated or manual as desired. Other optional processes may polish the first and the second optical surfaces if desired. Further, a device such as a gripper may insert the GRIN lens into an optical device, thereby forming an optical assembly having one or more GRIN lenses.

Figure 2A:
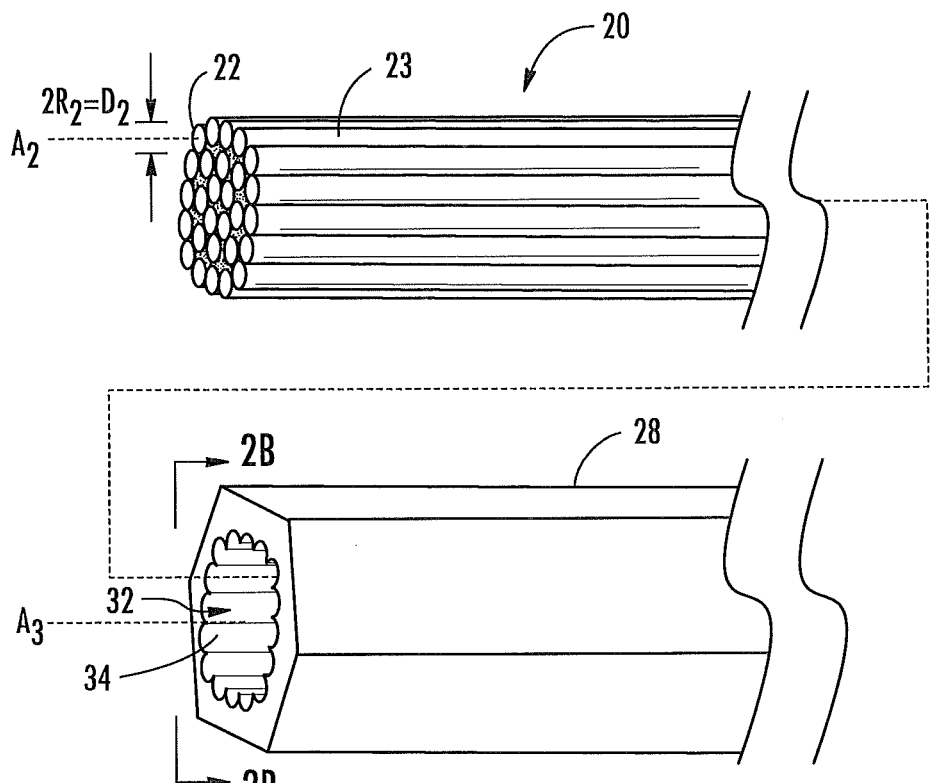
FIG. 2A is a perspective view of a plurality of GRIN rods prior to insertion within a carrier.

In this regard, FIG. 2A is a perspective view of a plurality 20 of GRIN rods 22. The GRIN rods 22 may have a longitudinal axis $A_2$ and a diameter $D_2$. The diameter $D_2$ may be the final diameter of a GRIN lens to be discussed later that has all the final characteristics to serve optically as a final product. The length L of each GRIN rod may be any suitable length such as at least six (6) inches long, but other lengths are possible. Each of the GRIN rods 22 may include a longitudinal surface 23 extending the length L of the GRIN rod 22.

Figure 1A:
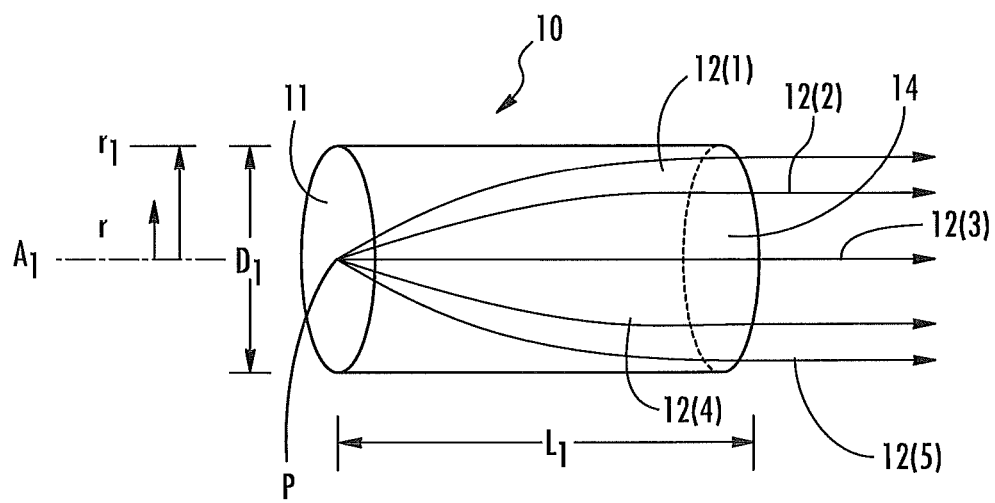
FIG. 1A is a perspective view of an exemplary quarter-pitch gradient index (GRIN) lens with a point source at a left optical surface emitting exemplary light rays which travel through the GRIN lens and exit at a right optical surface fully collimated.
Figure 1B:
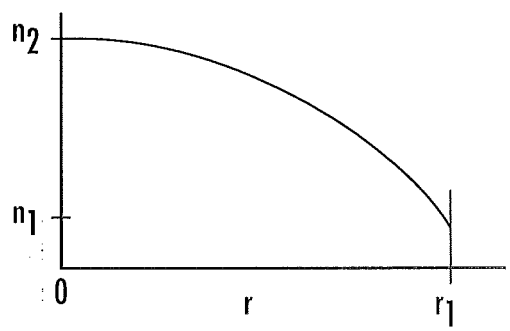
FIG. 1B is a graphic showing a changing index of refraction of the GRIN lens of FIG. 1A as a function of a radial distance r from a longitudinal axis of the GRIN lens.

The GRIN rods 22 may comprise for example, a graded-index multimode optical fiber made using, for example, a conventional manufacturing process. In this regard, the longitudinal axis $A_2$ may include a refractive index which decreases with an increasing distance away from the longitudinal axis $A_2$ as depicted in FIG. 1B. For example, the GRIN rods 22 may comprise glass or quartz with ions, for example, lithium or silver ions, added as part of an ion-exchange process or multiple ion-exchange process. In another example, the GRIN rods 22 may comprise a polymeric and/or monomeric material. The GRIN rods 22 may be produced in either a continuous or batch manufacturing process, as is known in the art.

Figure 2B:
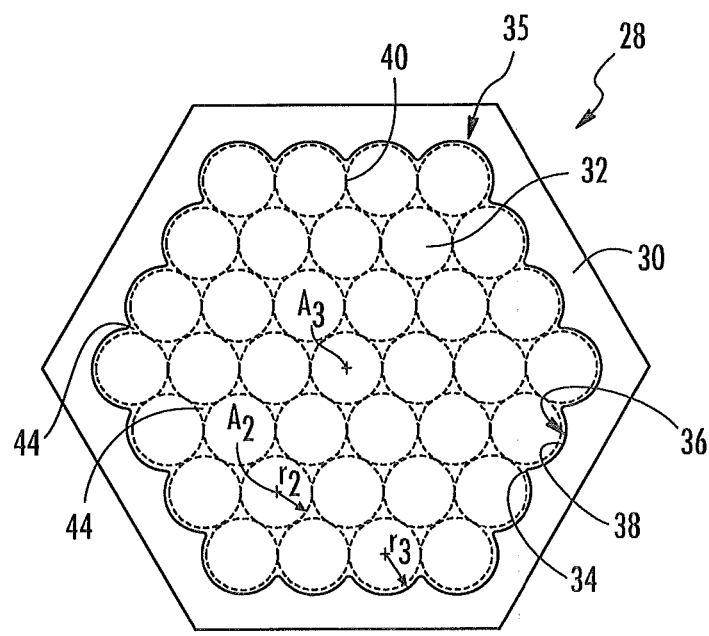
FIG. 2B is a side view aligned with a longitudinal axis $A_3$ of the carrier of FIG. 2A.
Figure 3:
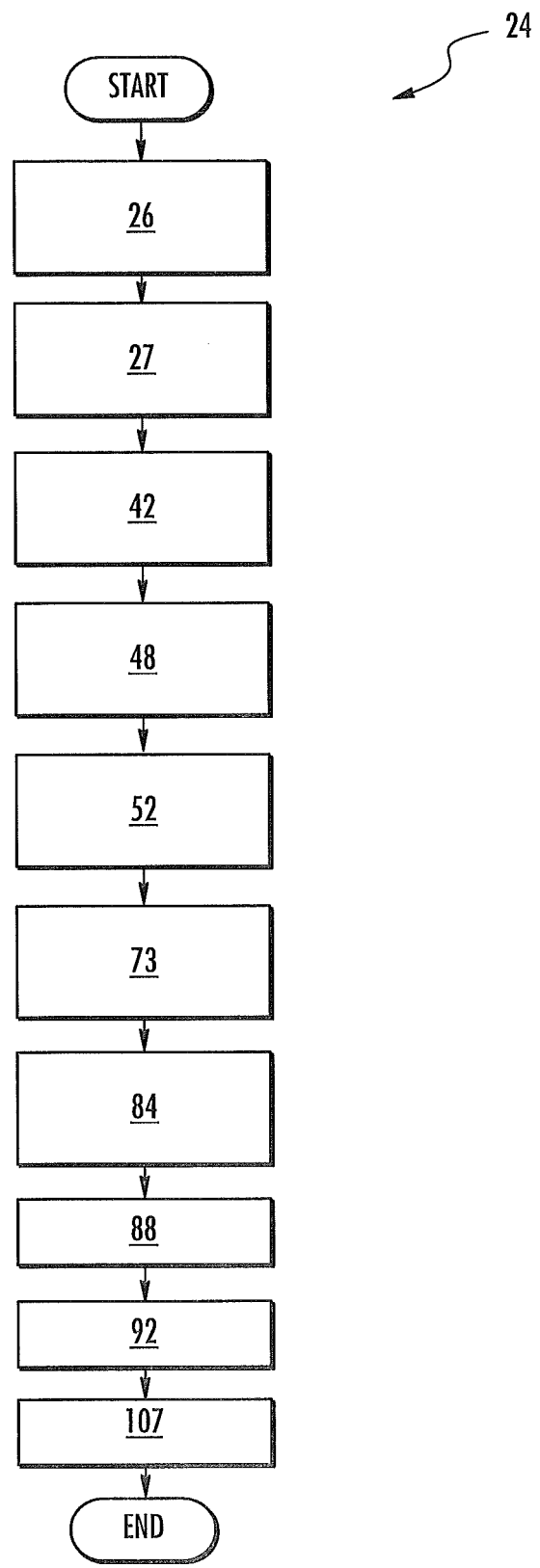
FIG. 3 is a block diagram of an exemplary process for manufacturing the GRIN rods of FIG. 2A into at least one GRIN lens to be assembled as part of an optical device.

FIG. 3 depicts an exemplary process 24 having one or more optional steps for manufacturing the GRIN rods 22 into at least one GRIN lens to be assembled as part of an optical device. First, the GRIN rods 22 are provided (step 26 of FIG. 3) having one or more of the characteristics discussed earlier. Next, as shown in FIGS. 2A and 2B, an optional carrier 28 may be provided (step 27 in FIG. 3) to hold the GRIN rods 22 collectively prior to their separation into GRIN lenses if desired. The carrier 28 may include a longitudinal axis $A_3$. The carrier 28 may include a carrier body 30 and an orifice 32. The orifice 32 may align the GRIN rods 22 to the longitudinal axis $A_3$ to keep the optical surfaces of individual GRIN lenses square. The orifice 32 may be at least partially surrounded by the carrier body 30. An inner surface 34 of the carrier body 30 forms a cross-sectional shape 35 of the orifice 32. The inner surface 34 may be configured to abut against the GRIN rods 22. The cross-sectional shape may be any shape, for example, a circle, rectangle, polygon, or hexagon. A hexagonal shape may be preferred to enable closest packing of the GRIN rods 22 within the orifice 32 as discussed later, but other suitable shapes are possible such as a triangle, rectangle, etc. The carrier 28 may be made of a strong material, for example, a thin-walled fine-grain zirconia tube which may be cut easily with conventional cutting tools and the cutting does not produce debris which may interfere with polishing processes. Of course, the use of other suitable materials for the carrier are possible.

As desired, the inner surface 34 of the carrier 28 may optionally include scalloped surfaces 36 which may abut against the GRIN rods 22 and may be parallel to the longitudinal axis $A_3$. The scalloped surfaces 36 may align the GRIN rods 22 within the carrier 28 in a parallel orientation, and also may provide a maximum density of the GRIN rods 22. The scalloped surfaces 36 may be formed of open circular recesses 38 having a radius of curvature $r_3$ greater than the radius $r_2$ of each of the GRIN rods 22. The size of the orifice 32 and associated inner surface 34 may be calculated to contain a maximum quantity of GRIN rods 22 to "pack out" the carrier 28 based on a close-packed structure 40 of the GRIN rods 22 as shown, for example, in dashed lines as part of FIG. 2B. The close-packed structure 40 allows closest packing of the GRIN rods 22 by reducing unused volume associated with interstitial space between the GRIN rods 22. However, in other embodiments other packing arrangements may be used to orientate the GRIN rods 22 within the orifice 32 of the carrier 28 as long as the longitudinal axes $A_2$, $A_3$ are aligned to enable dimensions to be processed uniformly for each of the GRIN rods 22. In the close-packed structure 40 shown in FIG. 2B, each GRIN rod 22 may abut against six (6) other GRIN rods 22 (see FIG. 4B). The scalloped surfaces 36 may be created, for example, using conventional three-dimensional machining tools.

Figure 4A:
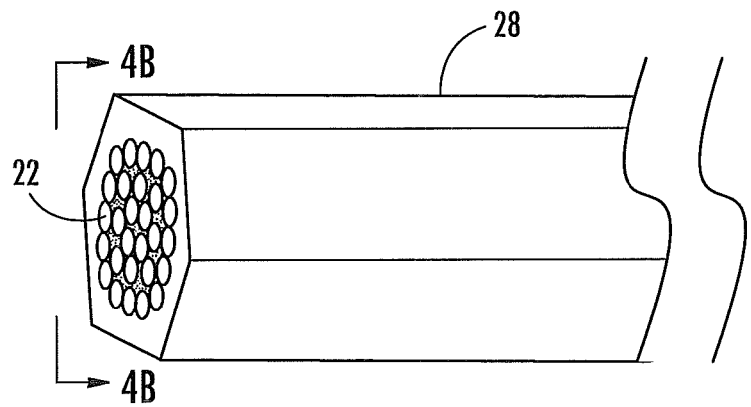
FIGS. 4A and 4B are a perspective view and a side view, respectively, of the GRIN rods inserted within the carrier of FIG. 2A.
Figure 4B:
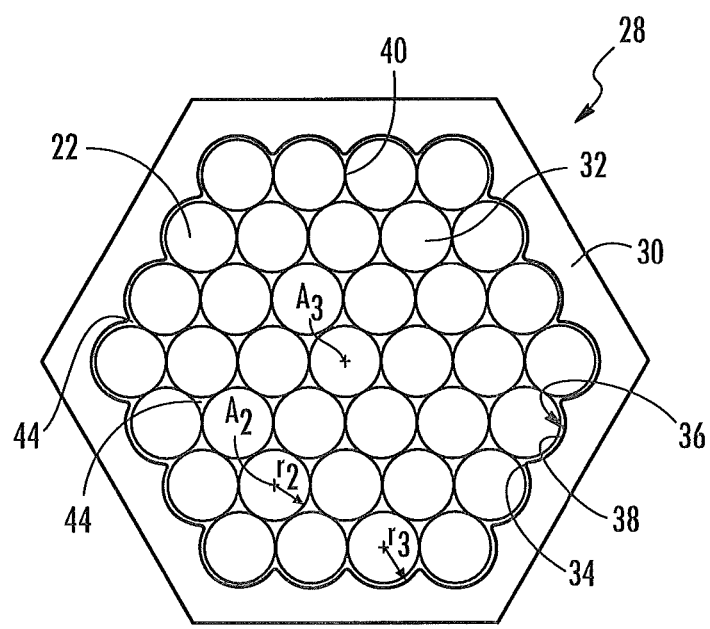

Next, with continuing reference to FIGS. 2A and 2B, the GRIN rods 22 may be inserted within the orifice 32 of the carrier 28 (step 42 in FIG. 3) so that the longitudinal axes $A_2$, $A_3$ of the GRIN rod 22 and the carrier 28 respectively are aligned, as shown in FIGS. 4A and 4B. The insertion process may be for a single GRIN rod 22 or multiple GRIN rods 22 to be inserted at one time to form the close-packed structure 40. The insertion process may be automated through the use of robotic technology if desired. Prior to insertion, the longitudinal surface 23 of each of the GRIN rods 22, as well as the inner surface 34 of the carrier 28, may be cleaned as appropriate. This cleaning may be accomplished with, for example, isopropyl alcohol to remove particulates. If not removed, the particulates may misalign the longitudinal axes $A_2$, $A_3$ by preventing proper abutment between adjacent GRIN rods 22 within the carrier 28 and proper abutment between the GRIN rods 22 and the carrier 28. Proper abutment may be required to create GRIN lenses 80 (see FIG. 14) with consistent dimensions possible through alignment within the carrier 28. Further, vibration of the carrier 28 at one or more non-destructive frequencies may be used to encourage proper abutment between adjacent GRIN rods 22 and the carrier 28. The vibration may be, for example, 300 hertz. As shown in FIG. 4B, after insertion, the GRIN rods 22 will occupy the orifice 32 of the carrier 28 and form at least one interstitial space 44 between adjacent GRIN rods 22 and between one or more GRIN rods 22 and the carrier 28. The interstitial space 44 may be monitored to determine whether the GRIN rods 22 have been properly inserted and aligned within the carrier 28.

Figure 5:
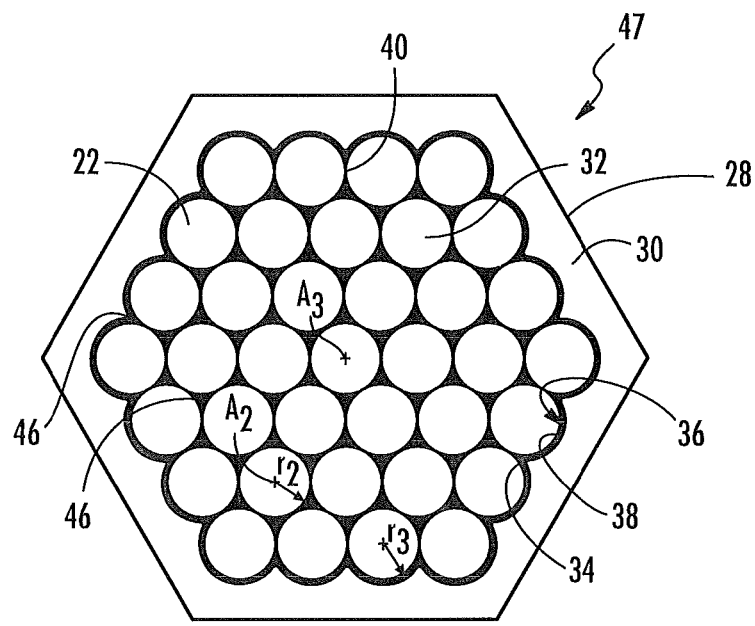
FIG. 5 is a side view aligned with the longitudinal axis $A_3$ of binding material adhered to the GRIN rods inserted within the carrier of FIG. 4A.

Next, as shown in FIG. 5, the interstitial spaces 44 may be filled with a binding material 46 to adhere the GRIN rods 22 collectively together and also to adhere the GRIN rods 22 to the inner surface 34 of the carrier 28 and thereby form a workpiece 47 (step 48 in FIG. 3). In other words, the workpiece 47 includes the binding material 46 within the carrier 28 for holding the GRIN rods 22 in a fixed position. A wide variety of binding material 46 may be available conventionally in the art and may be selected based on manufacturing requirements. The binding material 46 may be selected to be environmentally friendly. Additionally, the binding material 46 should be selected to have an appropriate melting temperature lower than the GRIN rods 22. The melting temperature of the binding material 46 may be high enough to permit the GRIN rods 22 to remain solid and rigid during a separation process (discussed later). The binding material 46 may be selected to provide sufficient adhesion with the longitudinal surface 23 of each of the GRIN rods 22 and the inner surface 34 of the carrier 28. The binding material 46 may be selected to remain liquid during the insertion process, yet not contaminate the GRIN rods 22. Consistent with these manufacturing requirements, the binding material 46 may be selected as, for example, a lead-free solder containing a metal alloy of silver, copper, tin and/or zinc, but other binding materials are possible according to the concepts disclosed.

Figure 6:
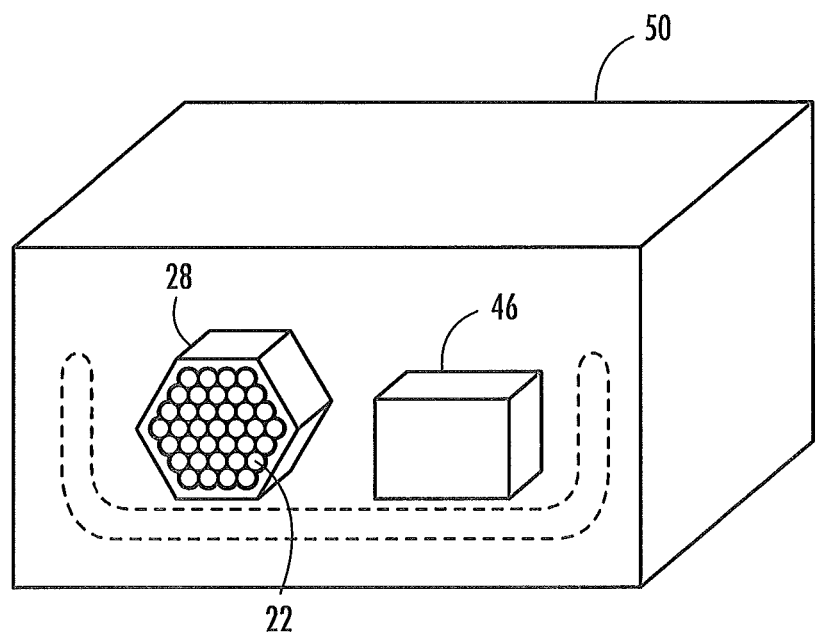
FIG. 6 is a perspective view of a vacuum heat chamber containing the binding material and the GRIN rods inserted within the carrier of FIG. 4A.

As shown in FIG. 6, in order to fill the interstitial spaces 44 with binding material 46, both the binding material 46 and the carrier 28, with the GRIN rods 22 inserted, may be placed in a vacuum heat chamber 50 of the like. The vacuum heat chamber 50 may create a heated and vacuum (or low pressure, for example, less than twenty-five (25) mTorr) environment to melt and allow the binding material 46 to be pulled into the interstitial spaces 44, with for example, surface tension, capillary effect, and/or pressure. The melting temperature of the binding material 46 may be for example, at least three-hundred twenty-five (325) degrees Fahrenheit. The vacuum heat chamber 50 may be a conventional heat chamber used for semiconductor or flat screen display manufacturing enabling robotic insertion and removal of objects from its interior; for example, a vacuum heat chamber used for an AKT-55K Flat Panel Manufacturing System as made by Applied Materials, Inc. of Santa Clara, Calif. Other vacuum heat chamber types may alternatively be used.

After the binding material 46 has been pulled into the interstitial spaces 44, an environment within the vacuum heat chamber 50 may return to ambient pressure gradually as the binding material 46 gradually cools and thereby solidifies to form the workpiece. Automation and/or manual technology may be used to remove the workpiece from the vacuum heat chamber and to transport the workpiece to the next processing operation.

Next, as shown in FIG. 7, the workpiece 47 may be separated along one or more separation planes P(1), P(2), P(3) into portions 53(1), 53(2), 53(3). The separation planes P(1), P(2), P(3) may be orthogonal to the longitudinal axis $A_3$ of the carrier 28 and a length $L_2$ apart (step 52 in FIG. 3). The length $L_2$ may be longer than a length $L_f$ a final length of the GRIN lens (see FIG. 14) since additional processing such as surface polishing may be desired. The final length $L_f$ may be, for example, in a range between one (1) millimeter and ten (10) millimeters.

As depicted in FIG. 8A, separation may occur using any suitable separation device such as a diamond wire saw 54 similar to the type used in the semiconductor industry for cutting silicon wafers while producing high-quality cutting surfaces. By way of example, the diamond wire saw 54 may be a DS 261 Wire Saw made by Meyer Berger AG of Thun, Switzerland. The diamond wire saw 54 may comprise a diamond cutting wire 56 moving with a speed S between two wire guides 58(1), 58(2) and fed by a feed wire container 60. The diamond cutting wire 56 may be removed to a used wire container 62 for recycling or refurbishment. The workpiece 47 may move in a direction Z through the diamond wire saw 54. The diamond wire saw 54 may include coolant nozzles 64(1), 64(2) for removing heat from the diamond cutting wire 56 and/or the carrier 28. As the diamond cutting wire 56 moves with the speed S, the carrier 28 may be moved in the direction Z until the carrier 28, the GRIN rods 22, and the binding material 46 are cut completely through at the one or more separation planes P(1), P(2), P(3) (see FIG. 7). One or more cutting passes may be required with the diamond wire saw 54.

Other separation devices may be used rather than a diamond wire saw 54. For example, as depicted in FIG. 8B, a diamond radial saw 66 may alternatively be used to separate the carrier 28 and associated GRIN rods 22 at the separation planes P(1), P(2), P(3).

Figure 9A:
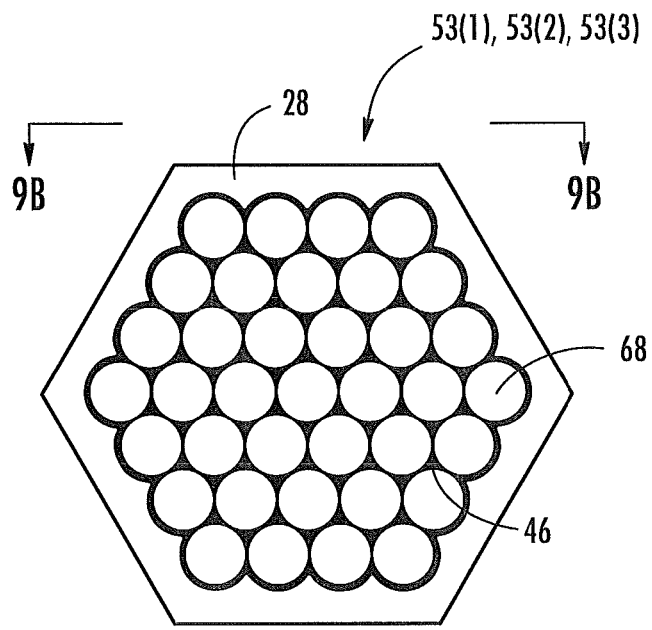
FIGS. 9A and 9B are a top view and a side view, respectively, of the carrier of FIG. 5 after being cut by a diamond wire saw, and the carrier now contains the GRIN lenslets and the binding material.
Figure 9B:
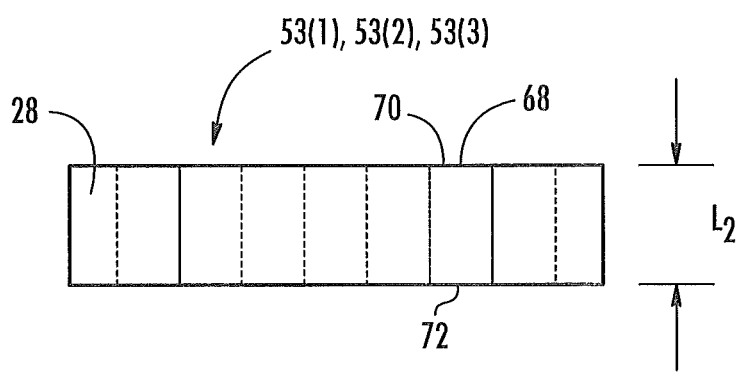

As shown in FIGS. 9A and 9B, once the carrier 28 and the GRIN rod 22 are cut or separated at the separation planes P(1), P(2), P(3) (see FIG. 7), then the portions of the GRIN rods 22 remaining in the carrier 28 form at least one GRIN lenslet 68. In other words, using the binding material and/or carrier for securing the GRIN rods and then cutting sections allows the processing of many GRIN rods to GRIN lenslets in a single operation. A GRIN lenslet 68 may be a GRIN lens that requires additional processing as necessary to create the desired shape and/or finish. The GRIN lenslet 68 may have a length $L_2$ longer than the final length $L_f$ of the GRIN lens for additional processing. The GRIN lenslet 68 may have a first optical surface 70 and a second optical surface 72.

Figure 10:
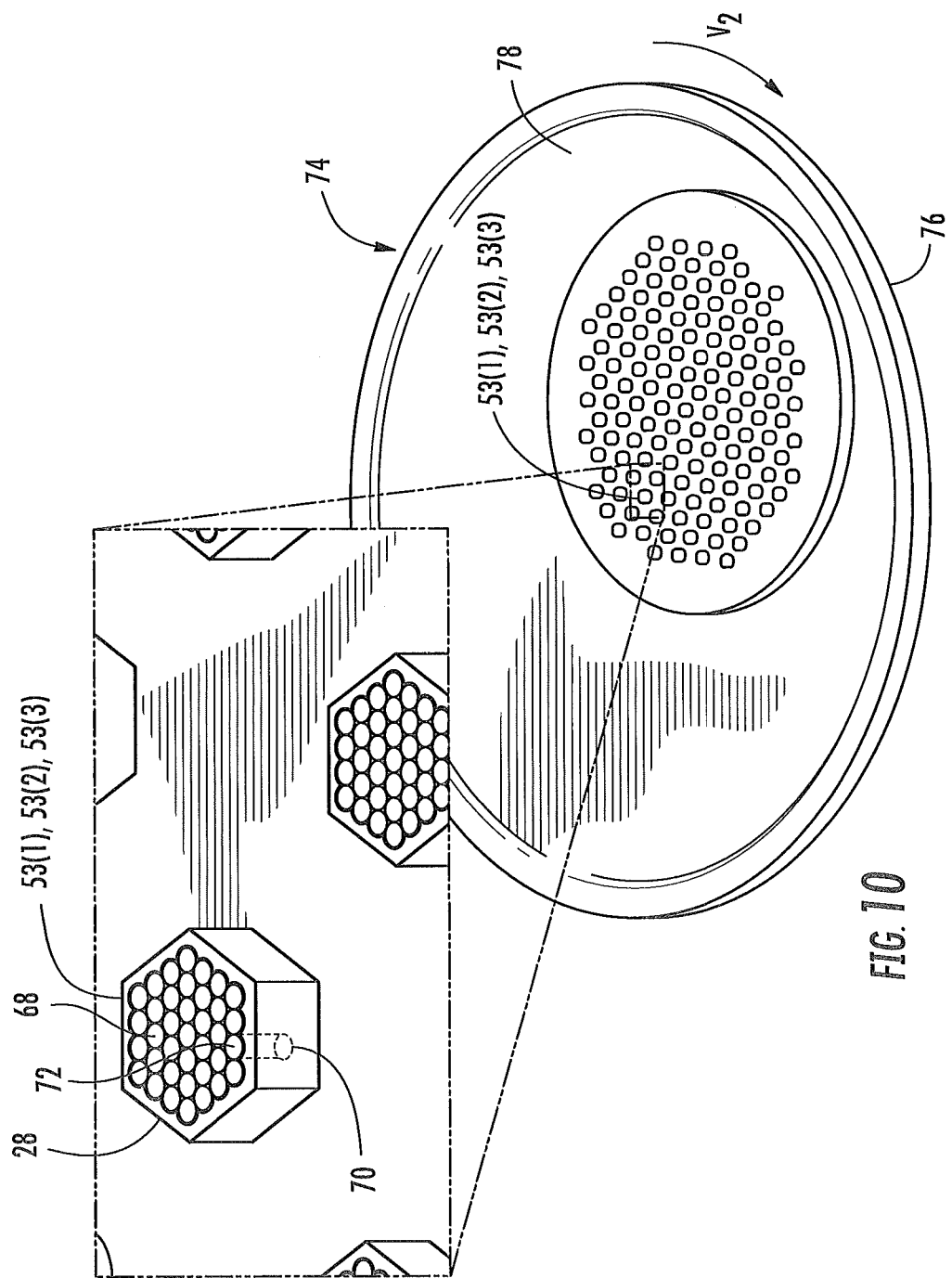
FIG. 10 is a perspective view of either a first optical surface or second optical surface of the GRIN lenslets of FIGS. 9A and 9B being polished with conventional grinding and/or lapping equipment to make a GRIN lens.

Next, as depicted in FIG. 10, the first optical surface 70 and the second optical surface 72 may optionally include the additional process step of polishing or finishing (step 73 in FIG. 3). The first optical surface 70 and the second optical surface 72 may be polished using conventional grinding and/or lapping equipment 74 as used, for example, in the semiconductor industry. The grinding or lapping equipment 74 may comprise a platen 76 rotating at a rotational speed $V_2$. The platen 76 may hold a slurry 78 containing fine grit to polish the first optical surface 70 and the second optical surface 72 and reduce the length $L_2$ of each GRIN lenslet 68 to the final length $L_f$, but other methods are possible for polishing/finishing. After the polishing and associated reduction in length, the GRIN lenslet 68 attached to the carrier 28 may be a GRIN lens 80 which is complete, as shown in FIG. 11.

Figure 11:
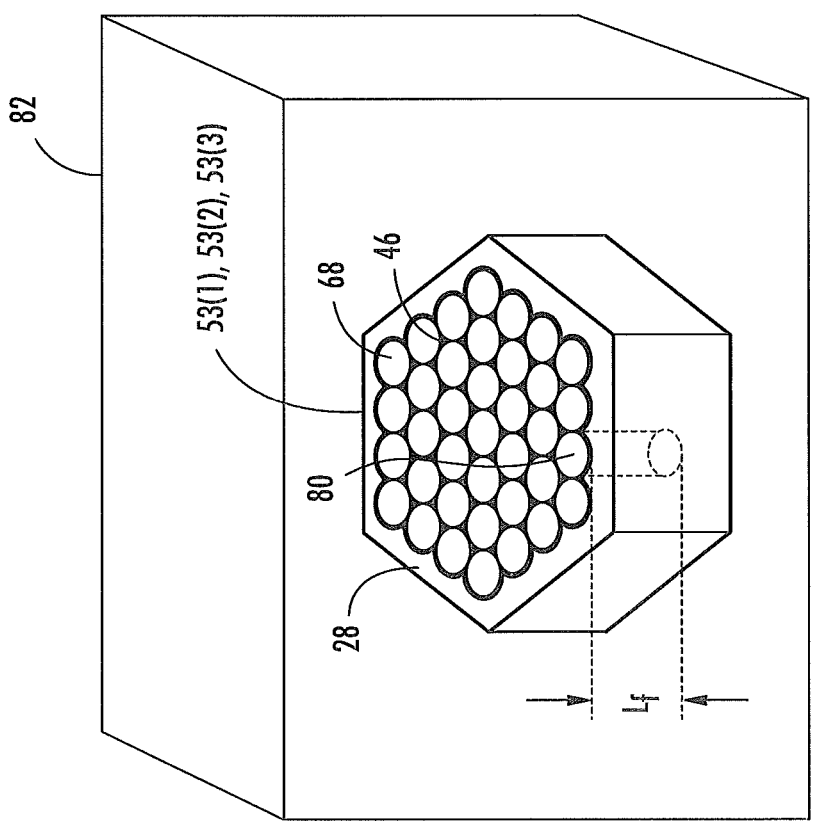
FIG. 11 is a perspective view of the carrier, the binding material, and the GRIN lens of FIG. 10 being heated in an oven above the melting temperature of the binding material.

Next, as also depicted in FIG. 11, the GRIN lens 80 may be placed in an oven 82 to heat the binding material 46 above its melting temperature to remove the binding material 46 from the carrier 28 and the at least one GRIN lens 80 (step 84 in FIG. 3). Once the binding material 46 may be removed, the GRIN lens 80 may be manually or robotically removed from the carrier 28.

Figure 12:
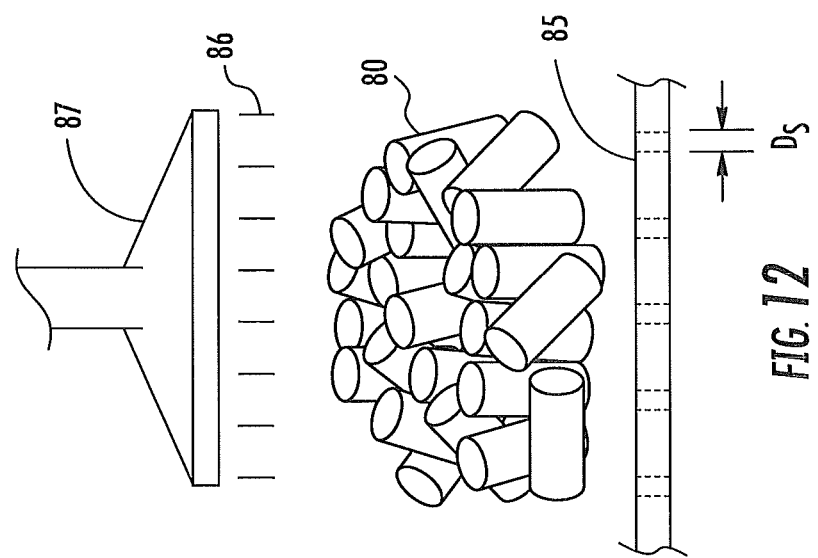
FIG. 12 is a perspective view of the GRIN lens of FIG. 11 being cleaned with a cleaning substance.

Next, as shown by FIG. 12, the GRIN lens 80 may, if required, be cleaned with a cleaning substance 86 to remove the binding material 46 remaining as residue (step 88 in FIG. 3). The cleaning substance 86 may be, for example, isopropyl alcohol. The cleaning substance 86 may be applied to the GRIN lens 80 in a downdraft workstation 87. In this regard, the cleaning substance 86 may be allowed to soak with the GRIN lens 80 before exiting through, for example, a sieve 85 with openings which are each one-hundred (100) microns in width $D_S$.

Figure 13A:
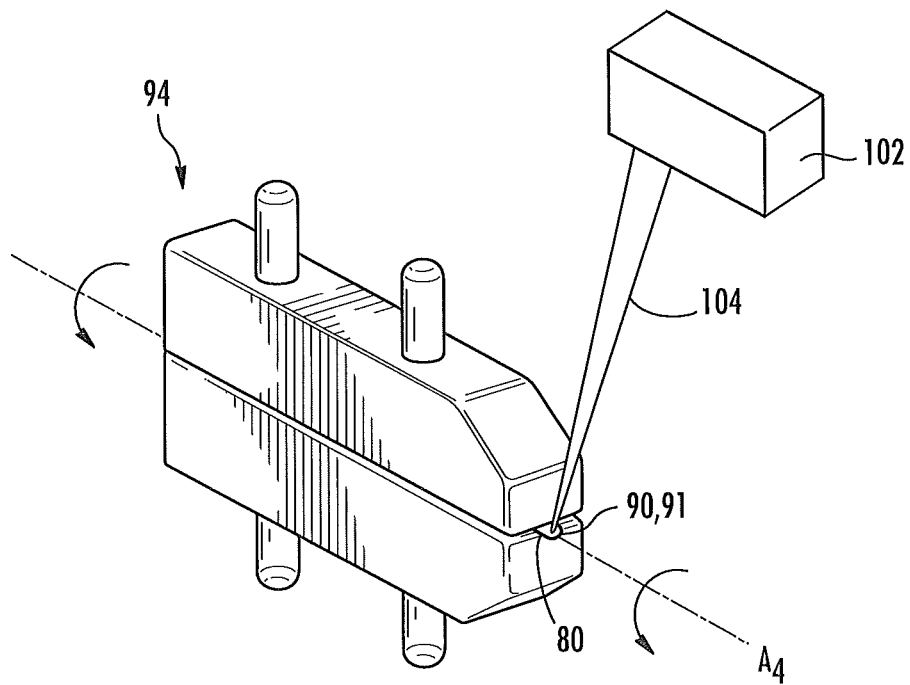
FIGS. 13A and 13B are perspective views of a laser beam focused on the first edge of the GRIN lens of FIG. 12 held by a gripper in an upright and angled position respectively while rotating about a longitudinal axis $A_4$.
Figure 13B:
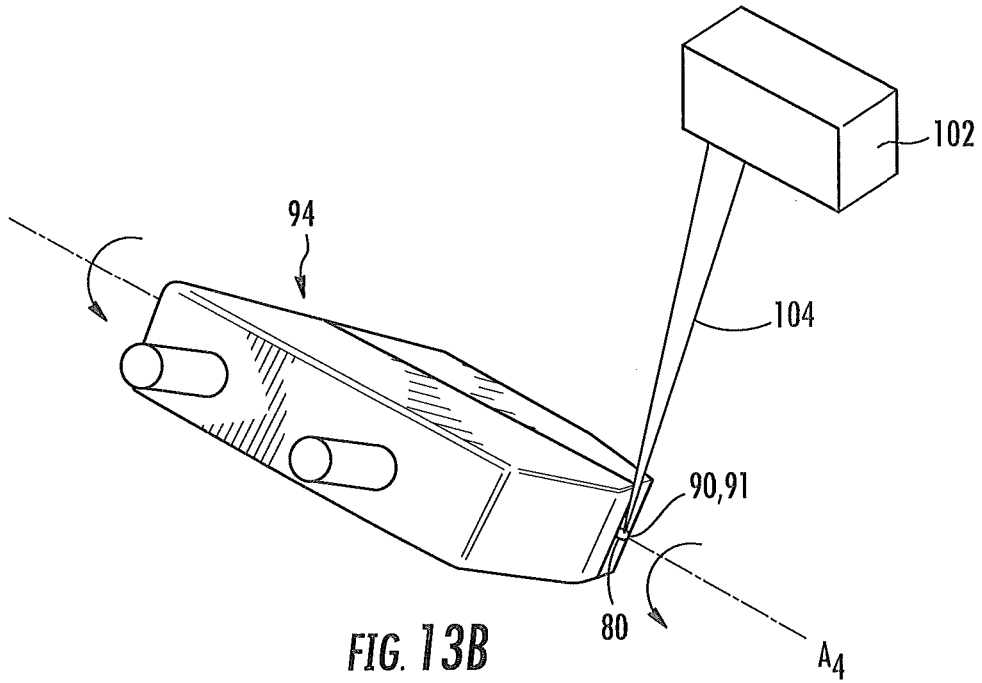
Figure 14:
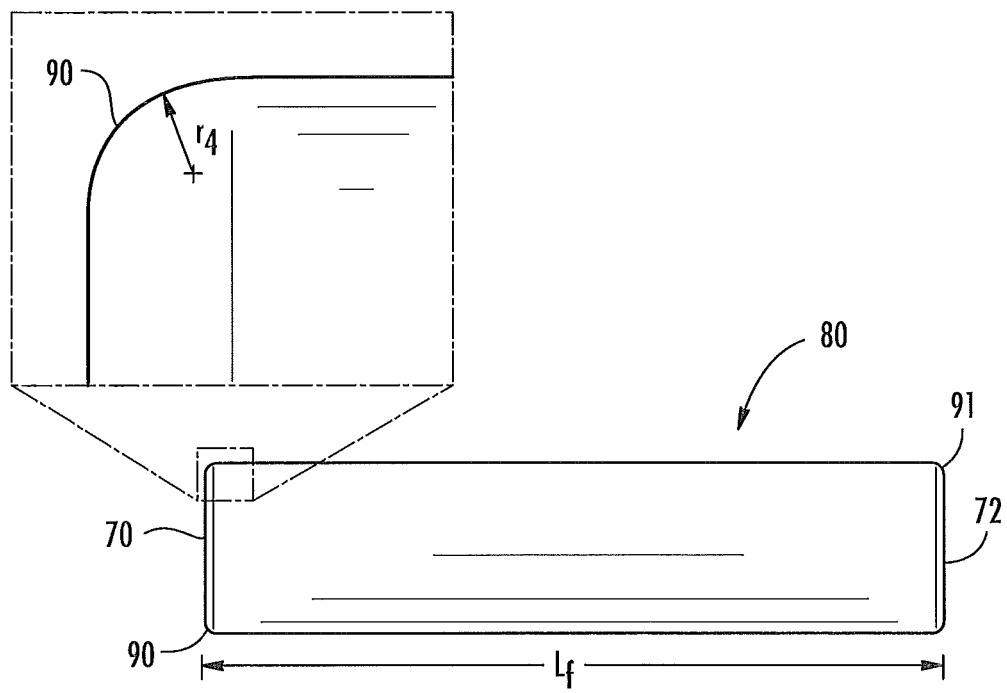
FIG. 14 is a side view of the first edge of one of the GRIN lenses of FIG. 13 after being softened.

Next, as shown in FIGS. 13A and 13B, a gripper 94 may be utilized with a laser 102 to soften one of a first edge 90 or a second edge 91 (step 92 in FIG. 3) for breaking sharp edges if desired. For example, FIG. 14 depicts the first edge 90 being softened by increasing a radius of curvature to $r_4$. The radius $r_4$ may be, for example, in a range from five (5) to ten (10) microns. In this regard, the laser 102 emits a laser beam 104 focused on the one or more of the first edge 90 and the second edge 91 in a technique sometimes referred to as "laser ablation." The laser 102 may be, for example, a sealed-$CO_2$ laser made by Coherent, Inc. of Santa Clara, Calif. As the laser beam 104 may focus on the one or more of the first edge 90 and the second edge 91, the gripper 94 may rotate about a longitudinal axis $A_4$ of the GRIN lens 80 to expose entire portions of the first edge 90 and the second edge 91 to the laser beam 104. Softening at least one of the first edge 90 and second edge 91 may be essential when the GRIN lens 80 is intended to be inserted within a bore in its final installation to prevent skiving upon insertion, but may not be required for other constructions.

Figure 15A:
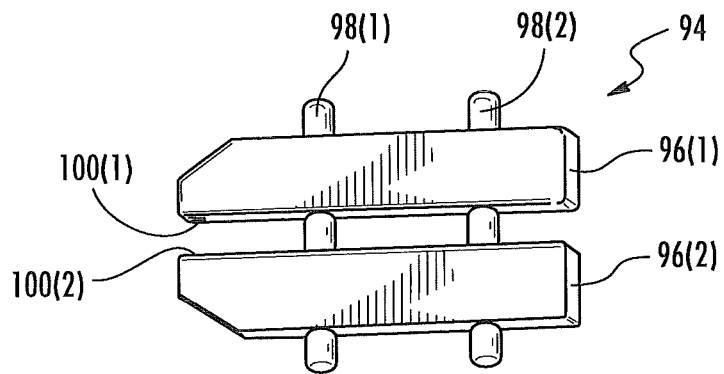
FIGS. 15A through 15C are perspective views of a gripper in an open, closed, and open and angled positions, respectively.
Figure 15B:
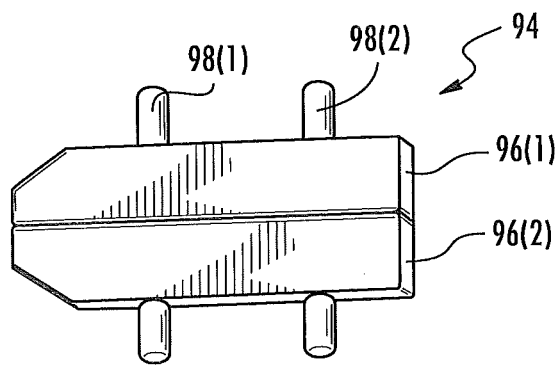
Figure 15C:
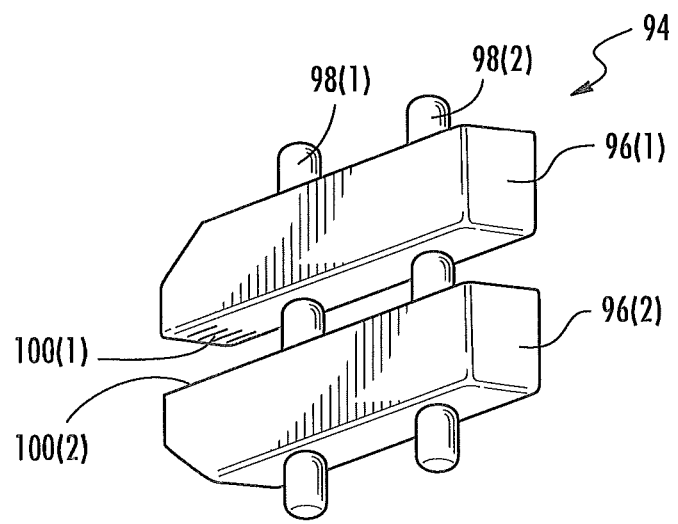

As shown by FIGS. 15A through 15C, the gripper 94 may comprise two clamping pieces 96(1), 96(2) adapted to translate along two guide rods 98(1), 98(2). The gripper 94 may include scalloped surfaces 100(1), 100(2) to hold the at least one GRIN lens 80 (see FIG. 15C). The scalloped surfaces 100(1), 100(2) may provide more surface area to hold the GRIN lenses 80 and inhibit movement.

Figure 16A:
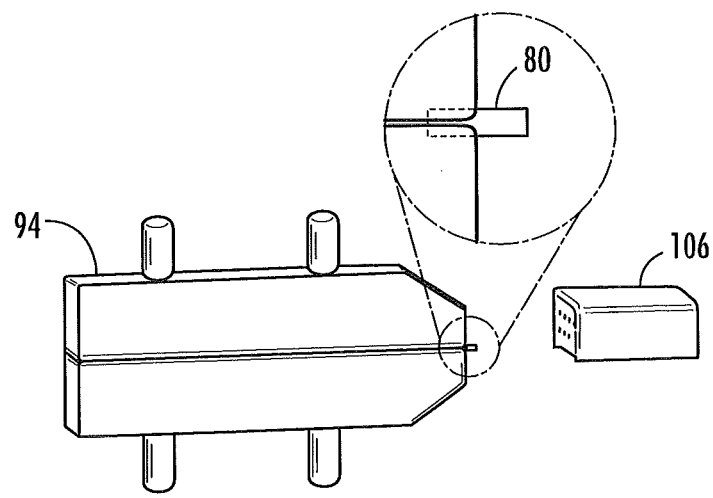
FIGS. 16A through 16C are perspective views of the gripper of FIGS. 15A through 15C holding the GRIN lens, inserting the GRIN lens into an optical device, and releasing from the GRIN lens, respectively.
Figure 16B:
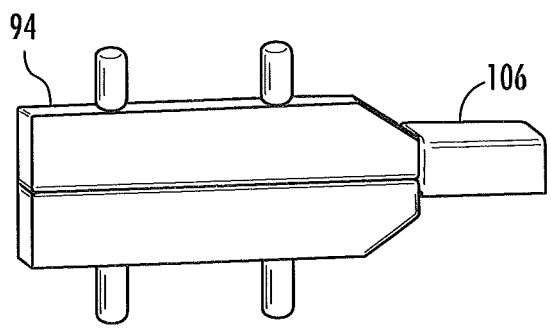
Figure 16C:
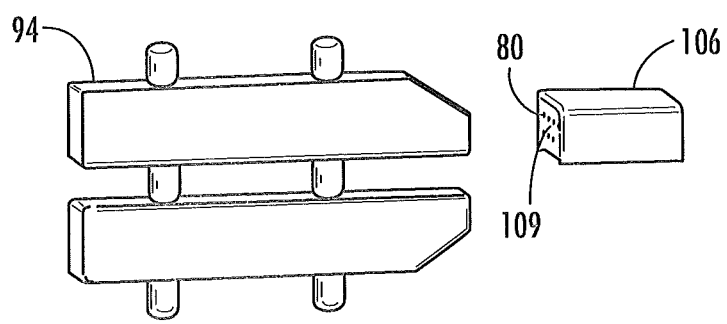

Next, as shown by FIGS. 16A through 16C, the gripper 94 may insert the GRIN lens 80 into an optical device 106 (step 107 in FIG. 3) if desired. The GRIN lens 80 may optionally be adhered to the optical device 106 by epoxy 109 which may be applied to the GRIN lens 80 or optical device 106 prior to the attachment of the GRIN lens 80 to the optical device 106. As shown in FIG. 16C, the gripper 94 may release the GRIN lens 80 after insertion and then pull away from the optical device 106.

The optical device 106 shown in FIG. 16C may be, for example, a GRIN lens holder 112 as shown in an exploded view in FIG. 17. The optical device 106 may include an enclosure 108 comprising a lens holder body 110 and a recessed cover 113. The lens holder body 110 may include one or more groove alignment features 114 where the one or more GRIN lenses 80 are inserted. The one or more optical fibers 116 may be attached to the GRIN lens holder 112 and orientated to enable ends 118 of the optical fibers 116 to be optically coupled to the GRIN lenses 80.

Figure 18:
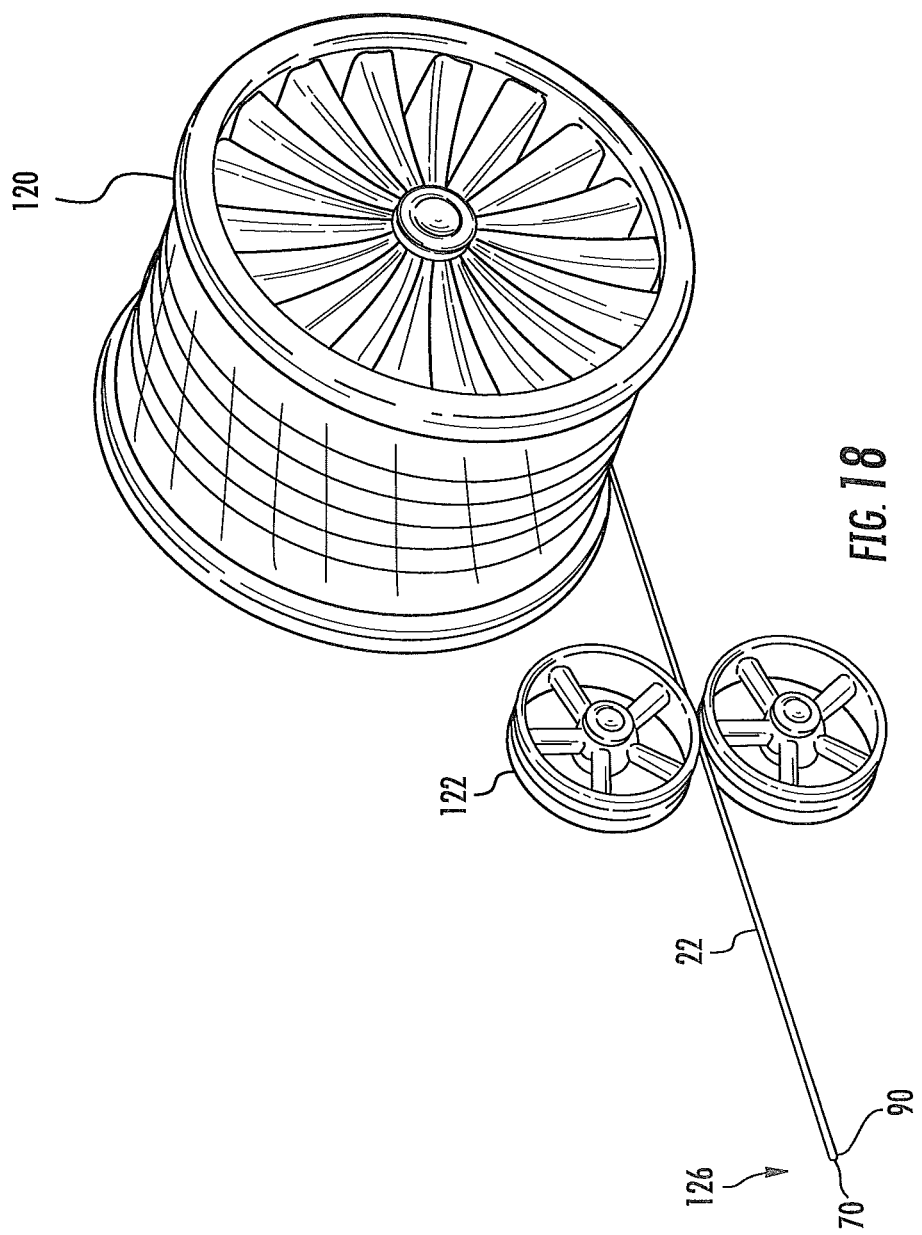
FIG. 18 is a perspective view of a GRIN rod being paid out from a reel.
Figure 19:
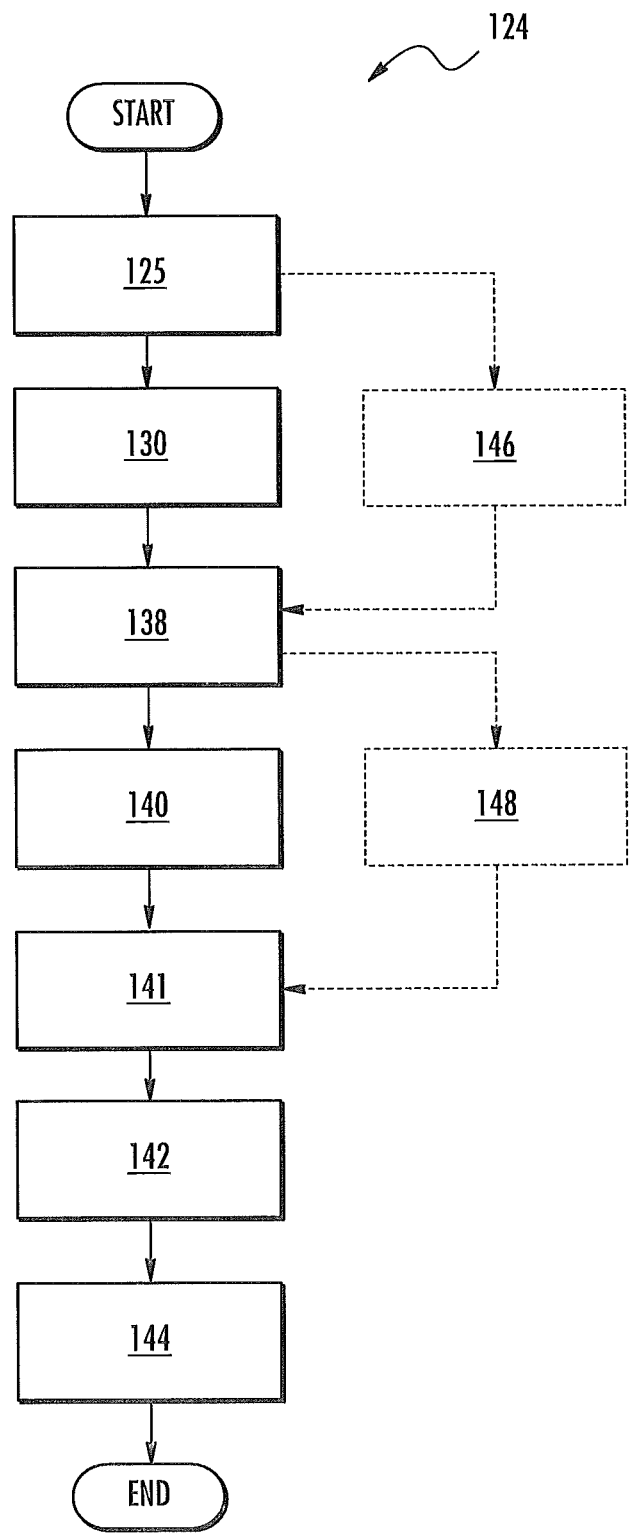
FIG. 19 is a block diagram of another exemplary process for manufacturing the GRIN rods of FIG. 18 into at least one GRIN lens to be assembled as part of the optical device of FIG. 16C.

In another alternative method shown in FIG. 18, the GRIN rod 22 is paid out from a reel 120 using a mechanical friction device 122. FIG. 19 depicts another exemplary process 124 for processing the GRIN rods 22 into the GRIN lens 80 to be assembled as part of the optical device 106 using the alternative method. The process 124 may be a continuous cyclical process that begins with the GRIN rod 22 being paid out (step 125 in FIG. 19). The GRIN rod 22 may be paid out every time one of the GRIN lenses 80 may have been separated from the GRIN rod 22, and another of the at least one GRIN lens 80 may begin processing, but this correlation may not be required. Once an initial GRIN lens of the at least one GRIN lens 80 is separated from the GRIN rod 22 the process can begin with the next cycle as desired. In this regard, as shown in FIG. 18, the first optical surface 70 with the first edge 90 of the next of the GRIN lenses 80 may be disposed at an end 126 of the GRIN rod 22.

Figure 20:
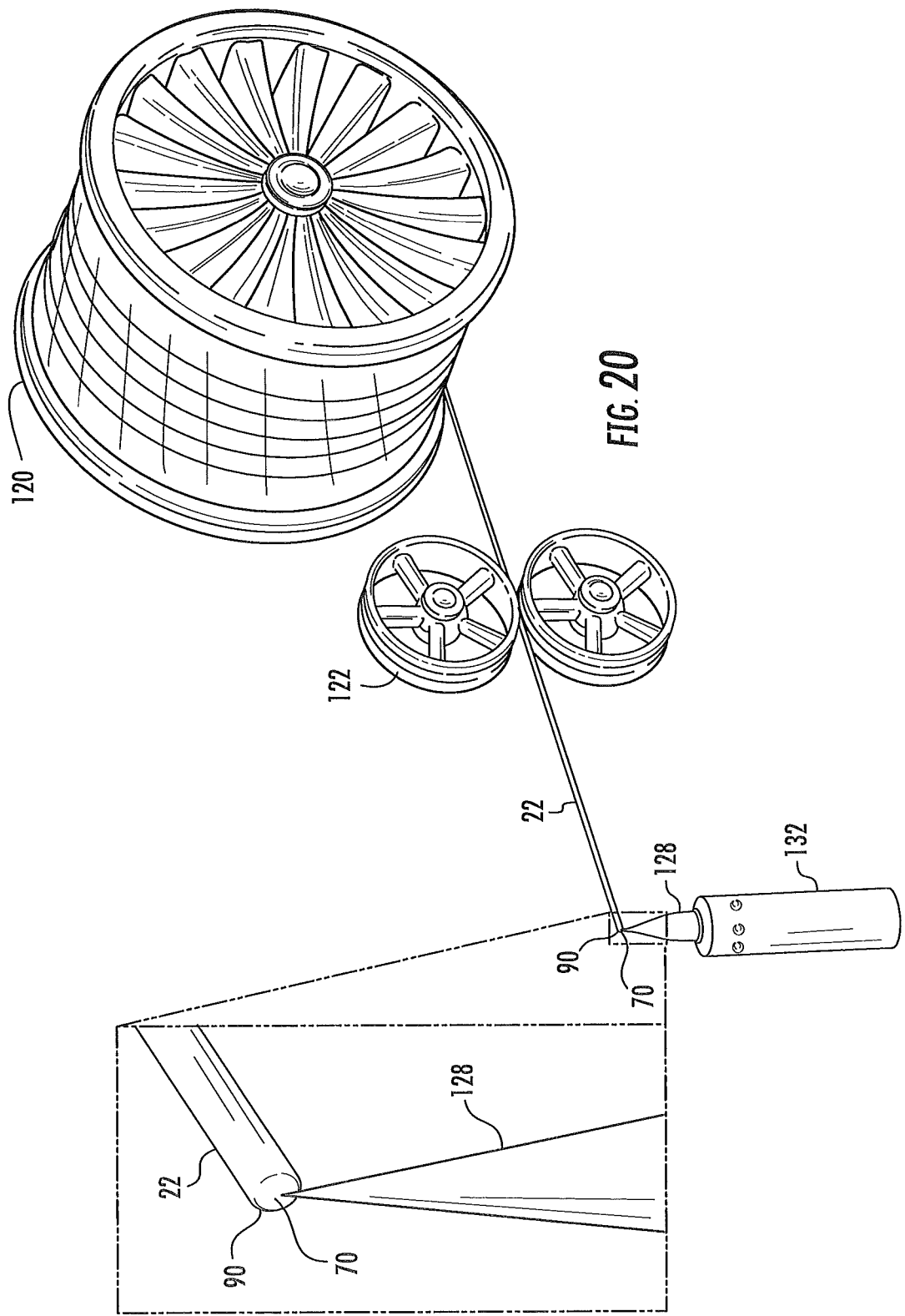
FIG. 20 is a perspective view of an edge of the GRIN rod of FIG. 18 being softened by a torch.

Next, as depicted in FIG. 20, the first edge 90 of the GRIN rod 22 may be softened with a torch 128 to increase the radius of curvature of the first edge 90 to $r_4$ (see FIG. 14) (step 130 in FIG. 19). The torch 128 may be provided, for example, by a propane torch 132 or other suitable heat source. The torch 128 may soften the first edge 90 and enhance the optical quality of the first optical surface 70. A temperature of the torch 128 and exposure duration of the GRIN rod 22 to the torch 128 may be optimized to prevent "bulbing" at the first optical surface 70 of the GRIN rod 22. Bulbing may occur when a diameter of the GRIN lens 80 may increase near the first optical surface 70 and the first optical surface 70 may become curvilinear.

Figure 21:
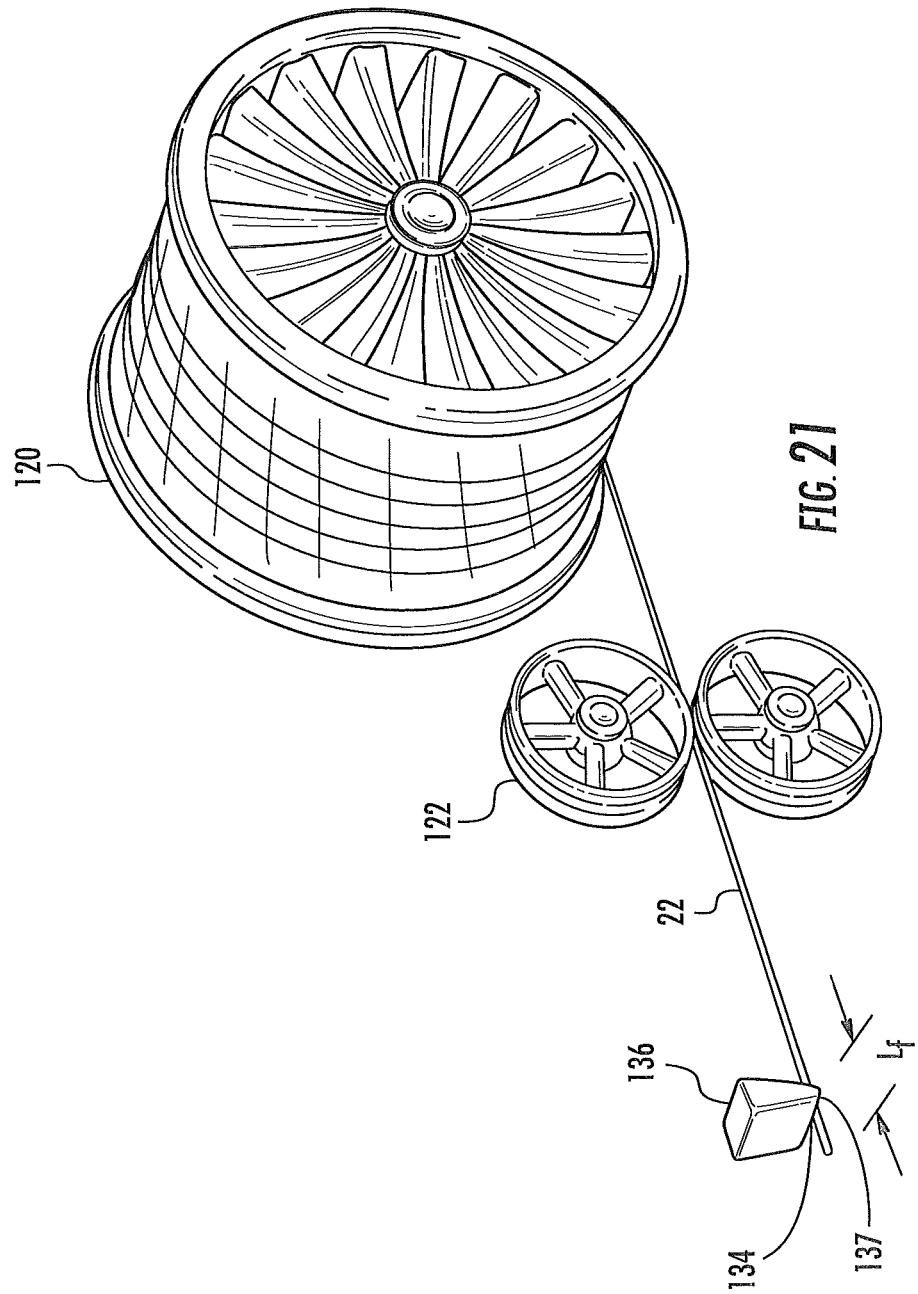
FIG. 21 is a perspective view of the GRIN rod of FIG. 20 being scribed by a conventional cleaving tool.

Next, as depicted in FIG. 21, a scribe 134 may be made in the GRIN rod 22 in a location disposed along the length $L_f$ from the first optical surface 70 with a conventional cleaving tool 136 (step 138 in FIG. 19). The cleaving tool 136 may include a sharp blade 137 of a hard material, for example, diamond, tungsten carbide, or sapphire configured to create a microscopic fracture or scribe 134 in the GRIN rod 22. The scribe 134 may serve as the microscopic fracture in the GRIN rod 22 as part of a technique sometimes called "mechanical cleaving" by which the GRIN lens 80 of the final length $L_f$ may be removed. Alternatively, the scribe 134 may be created with a laser beam 104 from a short wavelength laser 102.

Figure 22:
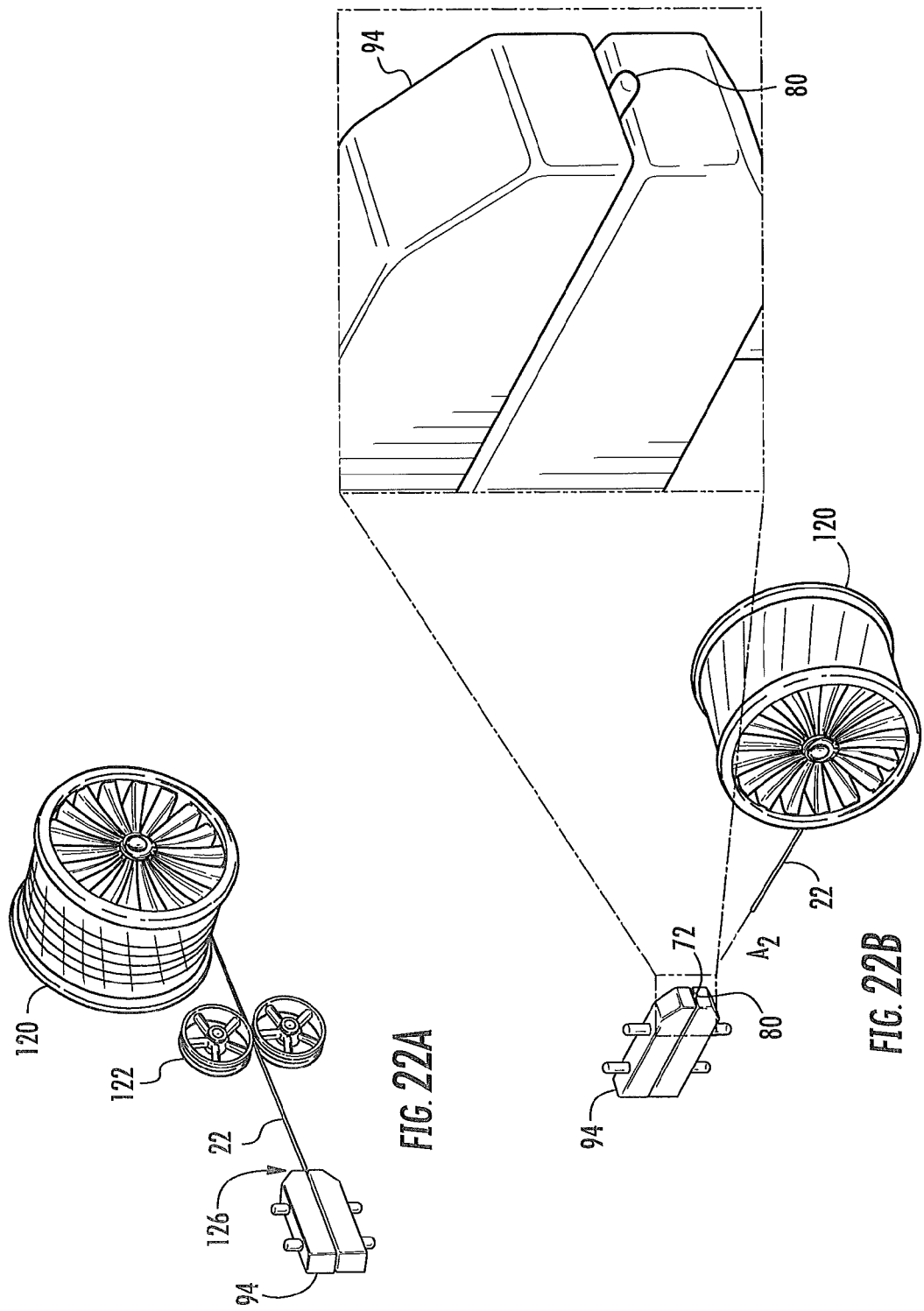
FIGS. 22A and 22B are perspective views of the gripper of FIGS. 15A through 15C applying a tensile force to the GRIN rod of FIG. 21 and then removing a GRIN lens from the GRIN rod, respectively.

Next, as shown in FIGS. 22A and 22B, the gripper 94 may hold the end 126 of the GRIN rod 22 and then remove the GRIN lens 80 from the GRIN rod 22 by applying tension parallel to the longitudinal axis $A_2$; for example, applying a tensile force on the GRIN rod 22 where the scribe 134 is located (step 140 in FIG. 19). The tensile force allows the microscopic fracture or scribe 134 to propagate orthogonal to the longitudinal axis $A_2$ of the GRIN rod 22 and thereby create the second optical surface 72. The tensile force may alternatively be applied while the scribe 134 is being made by the cleaving tool 136. The tensile force may be optimized based on materials utilized in the GRIN rod 22, the diameter of the GRIN rod 22, and other factors. In this regard, the tensile force may be, for example, at least one (1) pound for a four-hundred (400) micron diameter GRIN rod 22 comprising fused quartz.

Figure 23:
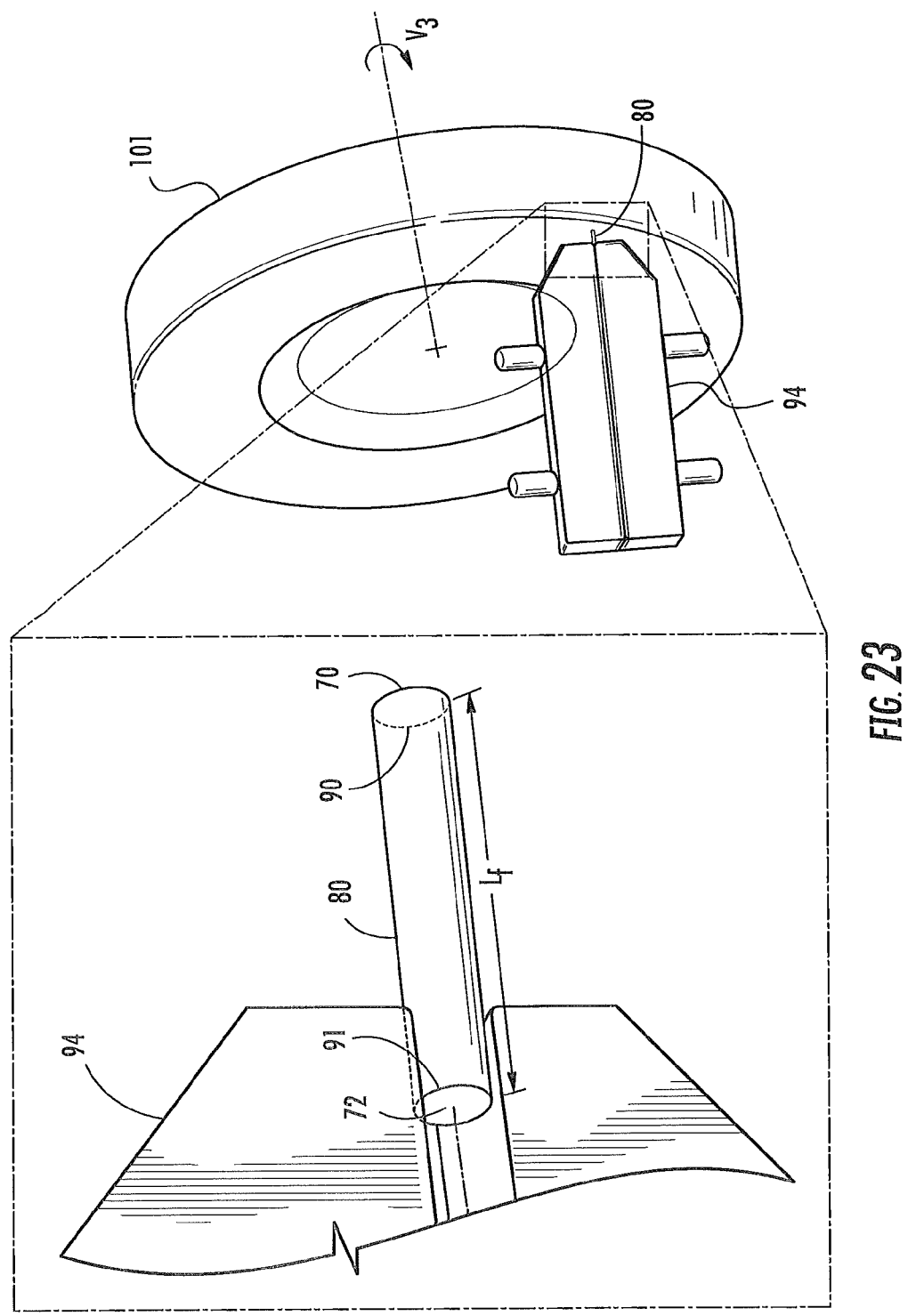
FIG. 23 is a perspective view of one of a first optical surface or second optical surface of the GRIN lens of FIG. 22B being polished by a grinding wheel.

Next, as shown in FIG. 23, the GRIN lens 80 may be treated to additional processing such as polishing and/or finishing the first optical surface 70 (step 141 in FIG. 19). One of the first optical surface 70 and the second optical surface 72 may be, for example, polished to final or near final optical quality by abutting the first optical surface 70 against a grinding wheel 101 or other device, shown in the embodiment of FIG. 23 as a high-speed diamond wheel rotating at a speed $V_3$. The GRIN lens 80 may be held by the gripper 94 during polishing to ensure proper quality and to protect manufacturing personnel. Both the first optical surface 70 and the second optical surface 72 may also be polished by the same process. For example, one of the first and second optical surfaces 70, 72 may be polished first. Then the GRIN lens 80 may be transferred to a second of the grippers 94 to expose another of the first and second optical surfaces 70, 72 to then be polished as desired.

Figure 24:
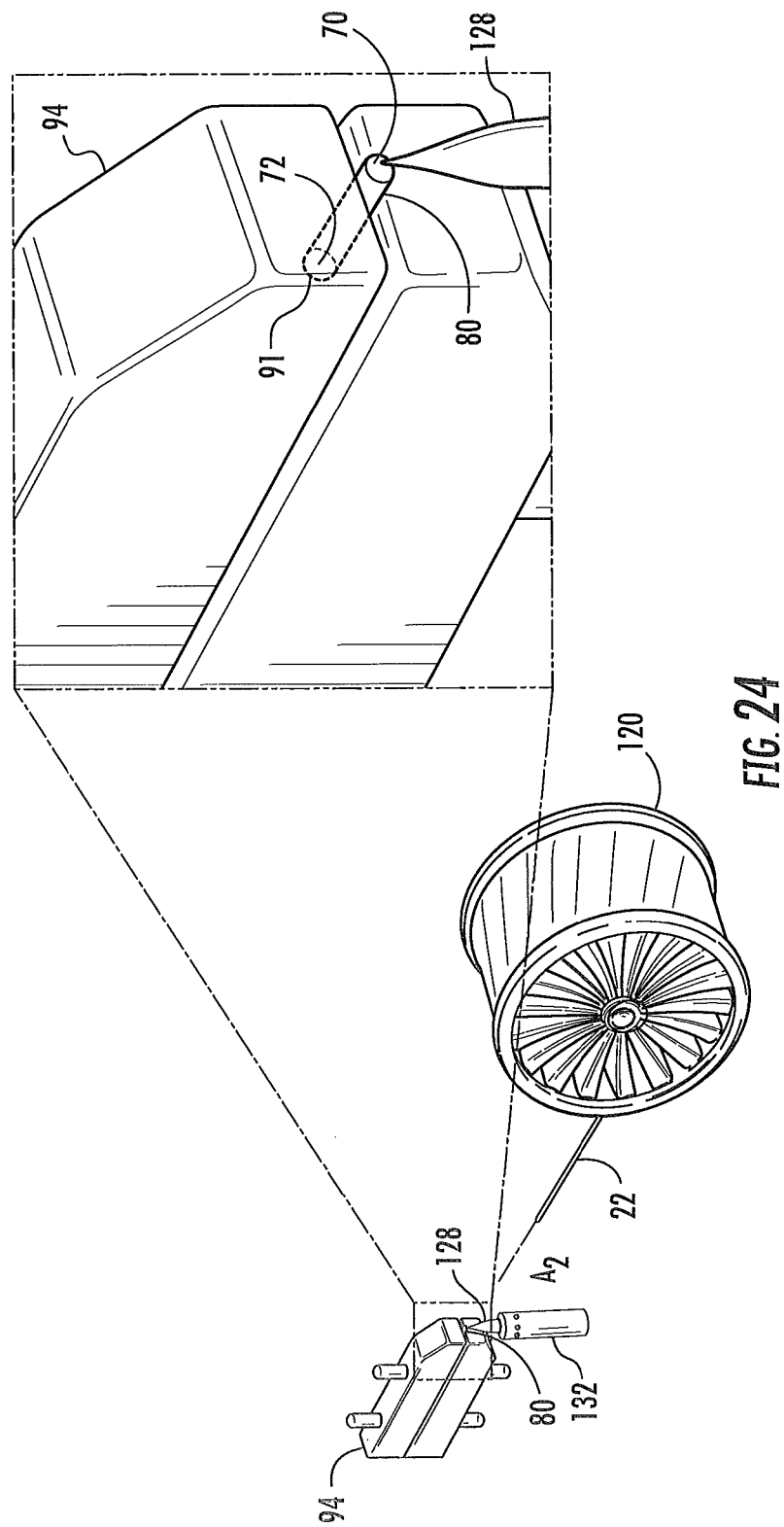
FIG. 24 is a perspective view of an edge of a second optical surface of the GRIN lens of FIG. 23B being softened by the torch of FIG. 20.

Next, as shown in FIG. 24, the gripper 94 may move the GRIN lens 80 to the torch 128 in order to soften the second edge 91 of the second optical surface 72 and enhance the optical quality of the second optical surface 72 (step 142 in FIG. 19) if desired. Careful movement of the GRIN lens 80 and careful control of the torch 128 may be required to avoid thermally bonding the GRIN lens 80 to the gripper 94. Next, as depicted previously in FIGS. 16A through 16C, the gripper 94 may insert the GRIN lens 80 into the optical device 106 (step 144 in FIG. 19) by automation or manually.

Figure 25:
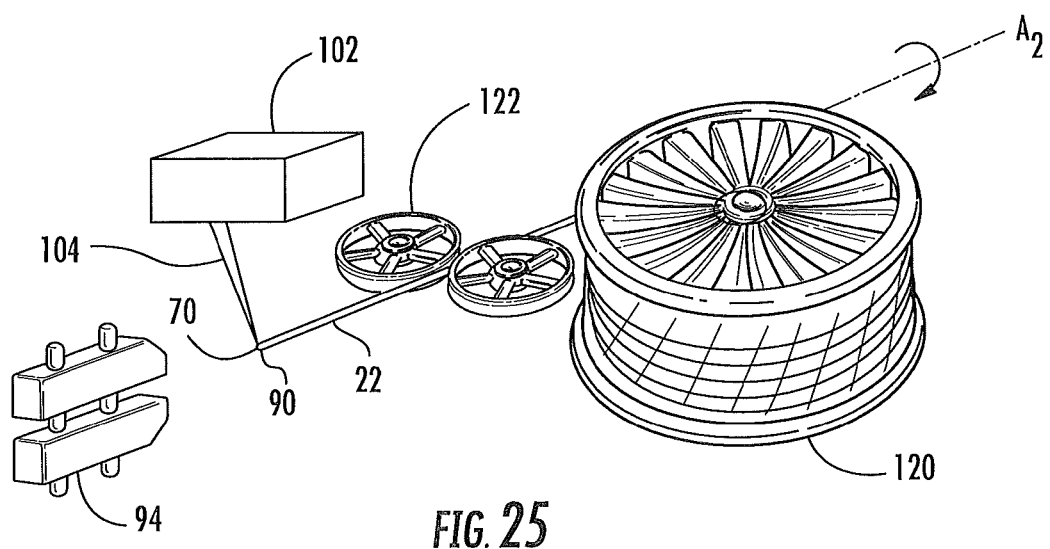
FIG. 25 is a perspective view of an edge of a first optical surface of the GRIN rod of FIG. 19 being softened by a laser while the GRIN rod is rotated about its longitudinal axis $A_2$.

Modifications may be made to the exemplary process 124 by altering, adding and/or deleting steps according to the concepts disclosed. For example, as shown in FIG. 25, the laser beam 104 may be used (step 146 in FIG. 19) instead of using the torch 128 (step 130 of FIG. 19) to soften the first edge 90 and enhance the optical quality of the first optical surface 70. In this regard, the GRIN rod 22, including perhaps the reel 120 and mechanical friction device 122, rotates with respect to the longitudinal axis $A_2$ of the GRIN rod 22 while the laser beam 104 may be used to allow the laser beam 104 exposure to an entire circumference of the GRIN rod 22.

Figures 26A, 26B:
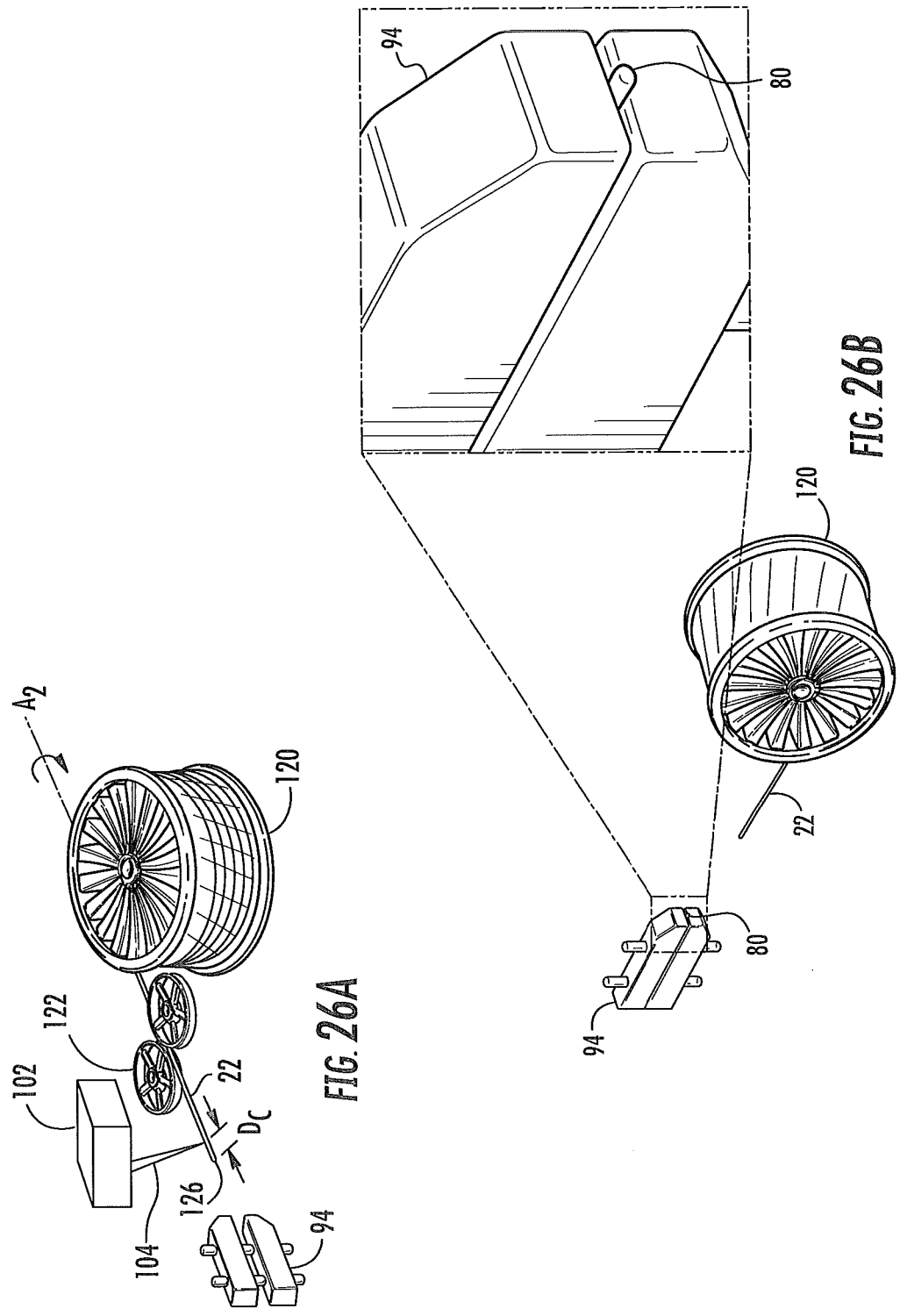
FIG. 26A is a perspective view of cutting the GRIN rod of FIG. 19 at a cutting distance away from the end of the GRIN rod with a laser beam.
FIG. 26B is a perspective view of the GRIN lens of FIG. 26A held by the gripper.

Further, another modification, for example, may be made to the exemplary process 124. As shown in FIGS. 26A and 26B, the GRIN lens 80 may alternatively be separated from the GRIN rod 22 by cutting the GRIN rod 22 a cutting distance $D_C$ away from the end 126 of the GRIN rod 22 by a laser beam 104 while the GRIN rod 22 rotates about its longitudinal axis $A_2$ (step 148 in FIG. 19) with respect to the laser 102. The reel 120 shall also rotate about the longitudinal axis $A_2$ of the GRIN rod 22. As shown in FIG. 26B, once the GRIN lens 80 has been separated from the GRIN rod 22, then the GRIN rod 80 may be held by the gripper 94.

Figure 27A:
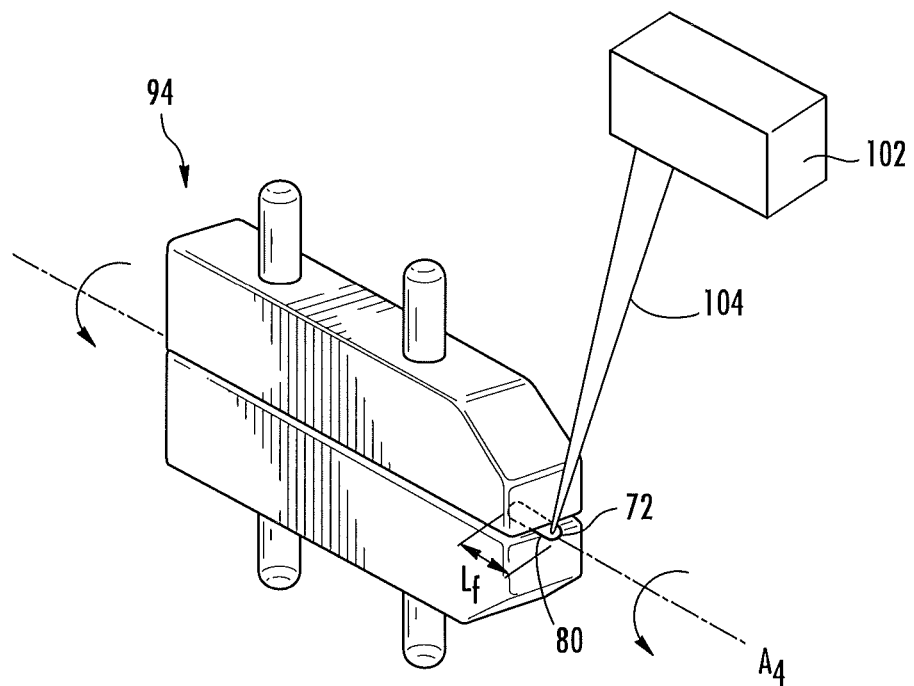
FIGS. 27A and 27B are perspective views of the laser beam removing material from the second optical surface of the GRIN lens of FIG. 26B to create the GRIN lens having a final length, and the GRIN lens being rotated with respect to the laser beam.
Figure 27B:
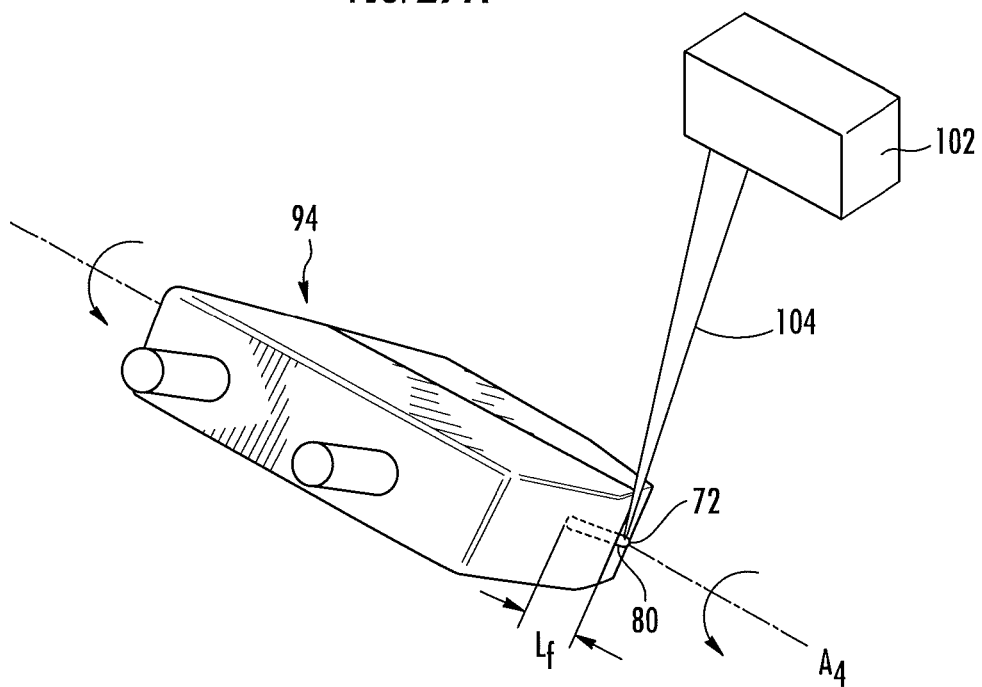

FIGS. 27A and 27B depict the final length $L_f$ of the GRIN lens 80 being achieved as material is removed from the second optical surface 72 of the GRIN lens 80 with a laser beam 104 as the GRIN lens 80 may be rotated about its longitudinal axis $A_4$. The rotation permits more uniform optical characteristics of the second optical surface 72. Use of laser beam 104 to separate the GRIN lens 80 from the GRIN rod 22, as opposed to the mechanical cleaving discussed earlier, may result in a better optical performance of the first optical surface 70 and/or the second optical surface 72.

It is noted that the first optical surface 70 at the end 126 of the GRIN rod 22 may also be completed to finished form by rotating the GRIN rod 22 about the longitudinal axis $A_2$ and removing material with the laser beam 104.

As non-limiting examples, the GRIN lenses 80 disclosed herein may comprise a generally cylindrical member having a radially-varying index of refraction, the cylindrical member having a length $L_f$ such that the lens may have a pitch less than about 0.25 or at least as large as 0.25. As used herein, the pitch length of the lens, Lo, is $2\pi/A$; the fractional pitch, or, hereafter, pitch, is $L/Lo=LA/2\pi$, where L is the physical length ($L_f$) of the lens. In various embodiments, the pitch is between about 0.08 and 0.23, such as, for example, lenses having pitches of 0.22, 0.21, 0.20, 0.19, 0.18, 0.17, 0.16, 0.15, 0.14, 0.13, 0.12, 0.11, 0.10, 0.09 and 0.08. Some embodiments relate to small diameter GRIN lenses 80, such as lenses having a diameter less than or equal to about one (1) millimeter, for example, four-hundred (400) microns.

Examples of optical devices 106 that can comprise or interface with the GRIN lenses 80 discussed herein, include, but are not limited to, fiber optic collimators, DWDMs, OADMs, isolators, circulators, hybrid optical devices, optical attenuators, MEMs devices, and optical switches.

Many modifications and other variations of the embodiments disclosed herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A method of manufacturing and assembling a gradient index (GRIN) lens, comprising:
   paying out a GRIN rod from a reel; and
   separating a GRIN lens from the GRIN rod with a gripper that holds at least one end of the GRIN lens prior to the separation, the GRIN lens comprising a longitudinal axis, a first optical surface angled largely perpendicular to the longitudinal axis, and a second optical surface angled largely perpendicular to the longitudinal axis and disposed a longitudinal distance along the longitudinal axis from the first optical surface, wherein the gripper comprises:
   an upper clamp piece and a lower clamp piece disposed below the upper clamp piece;
   a pair of spaced guide rods along which the upper and lower clamp pieces are translatable in a direction perpendicular to the longitudinal axis; and
   a pair of inwardly facing scalloped surfaces on opposing interior surfaces of the upper and lower clamp pieces, wherein the pair of inwardly facing scalloped surfaces are shaped to grip the at least one end of the GRIN lens in a fixed position.

2. The method of claim 1, wherein in the separating the GRIN lens from the GRIN rod, the longitudinal distance is a final length of the GRIN lens.

3. The method of claim 2, wherein the separating the GRIN lens from the GRIN rod includes scribing the GRIN rod with a cleaving tool and then subjecting the GRIN rod to a tensile force applied by the gripper.

4. The method of claim 2, wherein the separating the GRIN lens from the GRIN rod includes scoring the GRIN rod with a laser beam and then subjecting the GRIN rod to a tensile force applied by the gripper.

5. The method of claim 1, further comprising softening at least one of a first edge and a second edge with heat after separating the GRIN lens from the GRIN rod.

6. The method of claim 5, wherein the softening comprises exposing at least one of the first edge and the second edge to a laser beam.

7. The method of claim 5, wherein the softening comprises exposing at least one of the first edge and the second edge to a torch.

8. The method of claim 1, further comprising, after separating the GRIN lens from the GRIN rod, polishing at least one of the first optical surface and the second optical surface.

9. The method of claim 8, wherein the polishing comprises abutting at least one of the first optical surface and the second optical surface against a rotating grinding wheel.

10. The method of claim 1, wherein the separating the GRIN lens from the GRIN rod comprises rotating the reel and the GRIN rod with respect to a laser beam focused on the GRIN rod at a cutting distance from an end of the GRIN rod, then removing the GRIN lens from the GRIN rod at the second optical surface.

11. The method of claim 10, further comprising removing material from the second optical surface of the GRIN lens with the laser beam as the GRIN lens rotates about the longitudinal axis of the GRIN lens relative to the laser beam.

12. The method of claim 1, further comprising attaching with the gripper the GRIN lens to an optical device wherein epoxy is disposed between the GRIN lens and the optical device.

13. The method of claim 1, wherein the paying out the GRIN rod comprises utilizing a mechanical friction device.

14. The method of claim 1, further comprising softening a first edge of the GRIN lens prior to the separating the GRIN lens from the GRIN rod.

15. The method of claim 14, wherein the softening comprises exposing at least one of the first edge and a second edge to a laser beam.

16. The method of claim 14, wherein the softening comprises exposing at least one of the first edge and a second edge to a torch.

17. The method of claim 14, wherein the softening the first edge comprises increasing a radius of curvature of the first edge to at least five (5) microns and at most ten (10) microns.

18. The method of claim 17, wherein the softening the first edge comprises heating the first edge with a torch.

19. The method of claim 17, wherein the softening the first edge comprises heating the first edge with a laser beam.

20. The method of claim 3, wherein the tensile force is at least one (1) pound.

21. A method of manufacturing and assembling a gradient index (GRIN) lens, comprising:
   paying out a GRIN rod from a reel;
   separating a GRIN lens from the GRIN rod with a gripper that holds at least one end of the GRIN lens prior to the separation, the GRIN lens comprising a longitudinal axis, a first optical surface angled largely perpendicular to the longitudinal axis, and a second optical surface angled largely perpendicular to the longitudinal axis and disposed a longitudinal distance along the longitudinal axis from the first optical surface, wherein the gripper comprises:
      an upper clamp piece and a lower clamp piece disposed below the upper clamp piece;
      a pair of spaced guide rods along which the upper and lower clamp pieces are translatable in a direction perpendicular to the longitudinal axis; and
      a pair of inwardly facing scalloped surfaces on opposing interior surfaces of the upper and lower clamp pieces, wherein the pair of inwardly facing scalloped surfaces are shaped to grip the at least one end of the GRIN lens in a fixed position; and
   polishing at least one of the first optical surface and the second optical surface.

22. The method of claim 21, wherein the polishing comprises abutting at least one of the first optical surface and the second optical surface against a rotating grinding wheel.

23. The method of claim 21, wherein the separating the GRIN lens from the GRIN rod comprises rotating the reel and the GRIN rod with respect to a laser beam focused on the GRIN rod at a cutting distance from an end of the GRIN rod, then removing the GRIN lens from the GRIN rod at the second optical surface.

24. The method of claim 21, further comprising attaching with the gripper the GRIN lens to an optical device wherein epoxy is disposed between the GRIN lens and the optical device.

25. The method of claim 21, further comprising softening a first edge of the GRIN lens prior to the separating the GRIN lens from the GRIN rod.

26. The method of claim 25, wherein the softening comprises exposing at least one of the first edge and a second edge to a laser beam or a torch.

* * * * *